United States Patent
Kuhn et al.

(10) Patent No.: US 11,724,891 B2
(45) Date of Patent: *Aug. 15, 2023

(54) MODULAR TRANSFER UNITS, SYSTEMS, AND METHODS

(71) Applicant: Regal Beloit America, Inc., Beloit, WI (US)

(72) Inventors: John William Kuhn, Cold Spring, KY (US); Robert D. Lundahl, Frederick, MD (US); Robert W. Cutlip, Millersville, MD (US); Mark G. Bankard, Sykesville, MD (US); William D. Finch, New Windsor, MD (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,750

(22) Filed: Jan. 25, 2022

(65) Prior Publication Data

US 2022/0396434 A1 Dec. 15, 2022

Related U.S. Application Data

(63) Continuation of application No. 16/732,592, filed on Jan. 2, 2020, now Pat. No. 11,247,849, which is a
(Continued)

(51) Int. Cl.
*B65G 47/46* (2006.01)
*B65G 17/34* (2006.01)
(Continued)

(52) U.S. Cl.
CPC ........... *B65G 47/46* (2013.01); *B65G 13/071* (2013.01); *B65G 13/10* (2013.01); *B65G 17/08* (2013.01);
(Continued)

(58) Field of Classification Search
None
See application file for complete search history.

(56) References Cited

U.S. PATENT DOCUMENTS

| | | |
|---|---|---|
| 1,353,874 A | 9/1920 | Wego |
| 2,983,352 A | 5/1961 | Flora et al. |
| | (Continued) | |

FOREIGN PATENT DOCUMENTS

| | | |
|---|---|---|
| CN | 101171189 A | 4/2008 |
| CN | 202245193 U | 5/2012 |
| | (Continued) | |

OTHER PUBLICATIONS

Invitation to Pay Additional Fees from corresponding International Patent Application No. PCT/US2018/21842, dated Jun. 14, 2018, in 3 pages.

(Continued)

*Primary Examiner* — William R Harp
(74) *Attorney, Agent, or Firm* — Knobbe, Martens, Olson & Bear, LLP

(57) ABSTRACT

A modular transfer system with a primary flow system and a diverter system. The primary flow system includes a primary flow belt for conveying an article along a primary flow path from an infeed side of the modular transfer system to a pass-through side of the modular transfer system. The diverter system includes one or more diverter belts for diverting an article from the primary flow path towards a divert side of the modular transfer system. The primary flow belt includes multiple movable components contacting the diverter belt. The movable components can have one or more rotational degrees of freedom.

20 Claims, 23 Drawing Sheets

Related U.S. Application Data continuation of application No. 15/916,187, filed on Mar. 8, 2018, now Pat. No. 10,532,894.

(60) Provisional application No. 62/479,920, filed on Mar. 31, 2017, provisional application No. 62/470,760, filed on Mar. 13, 2017, provisional application No. 62/470,068, filed on Mar. 10, 2017.

(51) Int. Cl.
| | |
|---|---|
| *B65G 23/06* | (2006.01) |
| *B65G 17/40* | (2006.01) |
| *B65G 13/071* | (2006.01) |
| *B65G 17/08* | (2006.01) |
| *B65G 13/10* | (2006.01) |
| *B65G 17/24* | (2006.01) |
| *B65G 39/02* | (2006.01) |

(52) U.S. Cl.
CPC ........... *B65G 17/24* (2013.01); *B65G 17/345* (2013.01); *B65G 17/40* (2013.01); *B65G 23/06* (2013.01); *B65G 39/025* (2013.01); *B65G 2201/0238* (2013.01)

(56) References Cited

U.S. PATENT DOCUMENTS

| | | |
|---|---|---|
| 3,204,680 A | 7/1965 | Barry |
| 3,252,556 A | 5/1966 | Sven-eric |
| 3,593,591 A | 7/1971 | Chantland |
| 3,768,614 A | 10/1973 | Tabler |
| 3,934,953 A | 1/1976 | Tooley |
| 4,008,800 A | 2/1977 | Forsyth |
| 4,059,180 A | 11/1977 | Krivec et al. |
| 4,082,180 A * | 4/1978 | Chung ................... B65G 23/08 198/788 |
| 4,093,084 A | 6/1978 | Ringer |
| 4,100,368 A | 7/1978 | Thomsen |
| 4,101,180 A | 7/1978 | Anderson et al. |
| 4,148,386 A | 4/1979 | Bradbury |
| 4,168,771 A | 9/1979 | Krivec |
| 4,221,288 A | 9/1980 | Rae |
| 4,301,915 A | 11/1981 | Michalik et al. |
| 4,372,441 A | 2/1983 | Hans et al. |
| 4,383,605 A | 5/1983 | Harwick |
| 4,418,817 A | 12/1983 | Martin et al. |
| 4,448,302 A | 5/1984 | Weaver et al. |
| 4,476,974 A | 10/1984 | Bradbury |
| 4,508,212 A | 4/1985 | Bolle et al. |
| 4,577,747 A | 3/1986 | Martin |
| 4,601,685 A * | 7/1986 | Delhaes ................. B65G 15/46 198/840 |
| 4,664,243 A | 5/1987 | Martin |
| 4,681,203 A | 7/1987 | Kornylak |
| 4,681,215 A | 7/1987 | Martin |
| 4,815,588 A | 3/1989 | Katsuragi et al. |
| 4,925,009 A | 5/1990 | Hill et al. |
| 5,080,219 A | 1/1992 | Imai et al. |
| 5,096,045 A | 3/1992 | Feldl |
| 5,129,507 A | 7/1992 | Maeda et al. |
| 5,163,210 A | 11/1992 | Lostra |
| 5,188,210 A | 2/1993 | Malow |
| 5,222,920 A | 6/1993 | Cheesman et al. |
| 5,228,558 A * | 7/1993 | Hall ........................ H02P 5/50 198/577 |
| 5,228,820 A | 7/1993 | Stansfield et al. |
| 5,238,099 A | 8/1993 | Schroeder et al. |
| 5,240,102 A | 8/1993 | Lucas |
| 5,261,525 A | 11/1993 | Gabagnati |
| 5,289,913 A | 3/1994 | Fujio et al. |
| 5,361,884 A | 11/1994 | Yonezawa |
| 5,427,218 A | 6/1995 | Yonezawa |
| 5,597,156 A | 1/1997 | Classen |
| 5,609,238 A | 3/1997 | Christensen |
| 5,634,550 A | 6/1997 | Ensch et al. |
| 5,645,155 A | 7/1997 | Houghton |
| 5,653,325 A | 8/1997 | Enomoto |
| 5,701,992 A | 12/1997 | Enomoto |
| 5,735,388 A | 4/1998 | Brouwer |
| 5,810,158 A | 9/1998 | Schiesser et al. |
| 5,850,902 A | 12/1998 | Hicks et al. |
| 5,860,784 A | 1/1999 | Schuitema et al. |
| 5,862,907 A | 1/1999 | Taylor |
| 5,868,238 A | 2/1999 | Bonnet |
| 5,911,306 A | 6/1999 | Ferrari |
| 5,918,723 A | 7/1999 | Schuitema et al. |
| 5,927,465 A | 7/1999 | Shearer, Jr. |
| 5,971,618 A | 10/1999 | Ledingham |
| 6,008,556 A | 12/1999 | Ramthun |
| 6,041,909 A | 3/2000 | Shearer, Jr. |
| 6,056,107 A | 5/2000 | Schuitema et al. |
| 6,065,588 A | 5/2000 | Cotter et al. |
| 6,068,105 A | 5/2000 | Darwish et al. |
| 6,112,875 A | 9/2000 | Gibson |
| 6,126,017 A | 10/2000 | Hours |
| 6,138,819 A | 10/2000 | Bogle et al. |
| 6,139,240 A | 10/2000 | Ando |
| 6,148,990 A | 11/2000 | Lapeyre et al. |
| 6,168,544 B1 | 1/2001 | Barnes et al. |
| 6,196,375 B1 | 3/2001 | Cozza |
| 6,209,714 B1 | 4/2001 | Lapeyre et al. |
| 6,269,939 B1 | 8/2001 | Lapeyre et al. |
| 6,318,544 B1 | 11/2001 | O'Connor et al. |
| 6,343,685 B1 | 2/2002 | Hofer |
| 6,359,247 B1 | 3/2002 | Lem et al. |
| 6,367,616 B1 | 4/2002 | Lapeyre et al. |
| 6,370,447 B1 | 4/2002 | Miyazaki |
| 6,390,756 B1 | 5/2002 | Isaacs et al. |
| 6,398,015 B1 | 6/2002 | Sedlacek et al. |
| 6,454,082 B1 | 9/2002 | McTaggart et al. |
| 6,471,043 B2 | 10/2002 | Schwingshandl et al. |
| 6,493,939 B2 | 12/2002 | Ledingham |
| 6,494,312 B2 | 12/2002 | Costanzo |
| 6,533,099 B2 | 3/2003 | Bonham et al. |
| 6,550,609 B2 | 4/2003 | Coen et al. |
| 6,568,522 B1 | 5/2003 | Boelaars |
| 6,571,937 B1 | 6/2003 | Costanzo et al. |
| 6,578,697 B2 | 6/2003 | Bonham et al. |
| 6,688,459 B1 | 2/2004 | Bonham et al. |
| 6,705,452 B2 | 3/2004 | Greve et al. |
| 6,732,849 B2 | 5/2004 | Yamamoto |
| 6,752,534 B2 | 6/2004 | Ledingham |
| 6,758,323 B2 | 7/2004 | Costanzo |
| 6,860,376 B1 | 3/2005 | Heit et al. |
| 6,889,822 B1 | 5/2005 | Wagner et al. |
| 6,923,309 B2 | 8/2005 | Costanzo |
| 6,932,211 B2 | 8/2005 | Wieting et al. |
| 6,997,306 B2 | 2/2006 | Sofranec et al. |
| 6,997,309 B2 | 2/2006 | Stebnicki et al. |
| 7,007,792 B1 | 3/2006 | Burch |
| 7,011,208 B2 | 3/2006 | Nakashima |
| 7,040,480 B2 | 5/2006 | Sedlacek |
| 7,055,669 B2 | 6/2006 | Veit |
| 7,111,722 B2 | 9/2006 | Burch |
| 7,117,988 B2 | 10/2006 | Veit et al. |
| 7,124,876 B2 | 10/2006 | Wolf |
| 7,128,197 B2 | 10/2006 | Haan |
| 7,131,531 B1 | 11/2006 | Ryan |
| 7,137,505 B2 | 11/2006 | Stebnicki et al. |
| 7,145,095 B2 | 12/2006 | Cerutti et al. |
| 7,147,097 B2 | 12/2006 | Lemm |
| 7,191,894 B2 | 3/2007 | Costanzo et al. |
| 7,198,145 B1 | 4/2007 | Brown et al. |
| 7,213,701 B2 | 5/2007 | Deur |
| 7,216,759 B2 | 5/2007 | Rau et al. |
| 7,237,670 B1 | 7/2007 | Ryan |
| 7,240,781 B2 | 7/2007 | Ramaker et al. |
| 7,246,700 B2 | 7/2007 | Stebnicki et al. |
| 7,249,669 B2 | 7/2007 | Fourney |
| 7,249,671 B2 | 7/2007 | Riddick et al. |
| 7,252,192 B2 | 8/2007 | Stebnicki et al. |
| 7,284,653 B2 | 10/2007 | Fourney et al. |
| 7,284,654 B2 | 10/2007 | Affaticati et al. |

(56) References Cited

U.S. PATENT DOCUMENTS

| | | |
|---|---|---|
| 7,290,649 B2 | 11/2007 | Wolkerstorfer |
| 7,306,086 B2 | 12/2007 | Boelaars |
| 7,331,448 B2 | 2/2008 | Stebnicki et al. |
| 7,334,676 B1 | 2/2008 | McGourin et al. |
| 7,344,018 B2 | 3/2008 | Costanzo et al. |
| 7,360,641 B1 | 4/2008 | Fourney |
| 7,364,038 B2 | 4/2008 | Damkjaer |
| 7,383,935 B2 | 6/2008 | Tasma et al. |
| 7,398,874 B2 | 7/2008 | Deur |
| 7,419,043 B2 | 9/2008 | Veit |
| 7,422,098 B2 | 9/2008 | Bonham et al. |
| 7,426,992 B2 | 9/2008 | Fourney |
| 7,441,646 B2 | 10/2008 | Heit et al. |
| 7,461,739 B2 | 12/2008 | Fourney |
| 7,467,708 B2 | 12/2008 | McGettigan et al. |
| 7,497,316 B2 | 3/2009 | Hysell et al. |
| 7,506,750 B2 | 3/2009 | Costanzo et al. |
| 7,506,751 B2 | 3/2009 | Fourney |
| 7,513,356 B2 | 4/2009 | Veit et al. |
| 7,516,835 B2 | 4/2009 | Neiser et al. |
| 7,527,146 B2 | 5/2009 | Stebnicki et al. |
| 7,530,441 B2 | 5/2009 | Zimmer |
| 7,533,766 B1 | 5/2009 | Fourney |
| 7,537,104 B2 | 5/2009 | Riddick et al. |
| 7,537,105 B2 | 5/2009 | Fourney |
| 7,537,106 B2 | 5/2009 | Fourney |
| 7,540,368 B2 | 6/2009 | Weiser |
| 7,549,527 B2 | 6/2009 | Neiser et al. |
| 7,556,136 B2 | 7/2009 | Marshall et al. |
| 7,556,142 B2 | 7/2009 | Stebnicki et al. |
| 7,562,761 B2 | 7/2009 | Tasma et al. |
| 7,563,188 B2 | 7/2009 | Ozaki et al. |
| 7,581,632 B2 | 9/2009 | Wallace et al. |
| 7,588,137 B2 | 9/2009 | Fourney |
| 7,591,366 B2 | 9/2009 | Taylor |
| 7,604,110 B2 | 10/2009 | Deur |
| 7,607,533 B2 | 10/2009 | Pressler et al. |
| 7,617,923 B2 | 11/2009 | Riddick et al. |
| 7,681,710 B2 | 3/2010 | Kuhn et al. |
| 7,690,497 B2 | 4/2010 | Radwallner et al. |
| 7,725,213 B2 | 5/2010 | Hysell et al. |
| 7,726,461 B2 | 6/2010 | Risley |
| 7,731,010 B2 | 6/2010 | Kissee et al. |
| 7,743,905 B2 | 6/2010 | Fourney |
| 7,748,514 B2 | 7/2010 | Shimizu |
| 7,779,986 B2 | 8/2010 | Enomoto |
| 7,784,601 B2 | 8/2010 | Riddick et al. |
| 7,841,461 B2 | 11/2010 | Nguyen et al. |
| 7,854,314 B2 | 12/2010 | Pelak et al. |
| 7,857,116 B2 | 12/2010 | Heit et al. |
| 7,861,847 B2 | 1/2011 | Fourney et al. |
| 7,861,849 B2 | 1/2011 | Fourney |
| 7,863,536 B2 | 1/2011 | Cerutti et al. |
| 7,874,418 B2 | 1/2011 | Steinsträter |
| 7,878,319 B2 | 2/2011 | Costanzo et al. |
| 7,886,892 B2 | 2/2011 | Fourney |
| 7,891,481 B2 | 2/2011 | Pressler et al. |
| 7,905,345 B2 | 3/2011 | Taylor |
| 7,942,257 B2 | 5/2011 | DePaso et al. |
| 7,971,701 B2 | 7/2011 | Fourney |
| 7,992,701 B2 | 8/2011 | Wolf |
| 8,060,245 B2 | 11/2011 | Lupton et al. |
| 8,079,462 B2 | 12/2011 | Pelak et al. |
| 8,100,252 B2 | 1/2012 | Fourney |
| 8,104,606 B2 | 1/2012 | Rogers et al. |
| 8,109,384 B2 | 2/2012 | Pressler et al. |
| 8,123,021 B2 | 2/2012 | DePaso et al. |
| D657,807 S | 4/2012 | Frazier |
| 8,167,111 B2 | 5/2012 | Asman |
| 8,167,118 B2 | 5/2012 | Fourney |
| 8,172,069 B2 | 5/2012 | Prakasam |
| 8,186,031 B2 | 5/2012 | Whitney et al. |
| 8,186,499 B2 | 5/2012 | Brandt et al. |
| 8,196,736 B2 | 6/2012 | Wagner |
| 8,205,738 B1 | 6/2012 | Fourney |
| 8,308,368 B2 | 11/2012 | Blair et al. |
| D672,794 S | 12/2012 | Frazier |
| 8,342,313 B2 | 1/2013 | Wargo et al. |
| 8,364,307 B2 | 1/2013 | Carlson et al. |
| 8,371,431 B2 | 2/2013 | Neiser et al. |
| 8,424,675 B2 | 4/2013 | Rau |
| 8,459,440 B2 | 6/2013 | Onayama |
| 8,469,177 B2 | 6/2013 | Steenwyk |
| 8,469,178 B2 | 6/2013 | Butler |
| 8,474,596 B2 | 7/2013 | Wolkerstorfer et al. |
| 8,474,602 B2 | 7/2013 | Miller |
| 8,496,105 B2 | 7/2013 | MacLachlan et al. |
| 8,499,926 B2 | 8/2013 | Steinsträter |
| 8,511,460 B2 | 8/2013 | Ragan et al. |
| 8,528,742 B2 | 9/2013 | Wargo et al. |
| 8,534,172 B2 | 9/2013 | Fourney |
| 8,573,389 B2 | 11/2013 | Stebnicki et al. |
| 8,579,105 B2 | 11/2013 | Butler et al. |
| 8,622,202 B2 | 1/2014 | Rau et al. |
| 8,646,595 B2 | 2/2014 | Miller et al. |
| 8,720,668 B2 | 5/2014 | Ragan et al. |
| 8,746,442 B2 | 6/2014 | Schwai |
| 8,753,060 B2 | 6/2014 | Ueda et al. |
| 8,757,353 B2 | 6/2014 | Nieser et al. |
| 8,763,788 B2 | 7/2014 | Neiser |
| 8,763,789 B2 | 7/2014 | Wallace |
| 8,776,982 B2 | 7/2014 | Onayama |
| 8,790,061 B2 | 7/2014 | Yamashita |
| 8,813,943 B2 | 8/2014 | Ramankutty et al. |
| 8,820,520 B2 | 9/2014 | Triesenberg et al. |
| 8,825,205 B2 | 9/2014 | Yokota et al. |
| 8,862,306 B2 | 10/2014 | Yokota et al. |
| 8,899,407 B2 | 12/2014 | Harrington |
| 8,915,353 B2 | 12/2014 | Fourney |
| 8,919,542 B2 | 12/2014 | Triesenberg et al. |
| 8,973,506 B2 | 3/2015 | Yamashita |
| 8,978,879 B2 | 3/2015 | Fourney |
| 8,983,651 B2 | 3/2015 | Combs et al. |
| 8,985,304 B2 | 3/2015 | Guernsey et al. |
| 9,004,264 B2 | 4/2015 | Baek, IV et al. |
| 9,016,456 B1 | 4/2015 | Neiser et al. |
| 9,020,632 B2 | 4/2015 | Naylor |
| 9,037,290 B2 | 5/2015 | Neiser et al. |
| 9,038,809 B2 | 5/2015 | Wilkins et al. |
| 9,073,703 B2 | 7/2015 | Fourney |
| 9,079,717 B1 | 7/2015 | Costanzo et al. |
| 9,096,379 B2 | 8/2015 | Gilley et al. |
| 9,108,807 B1 | 8/2015 | Ogle, II |
| 9,150,362 B2 | 10/2015 | Vegh et al. |
| 9,156,629 B2 | 10/2015 | Costanzo et al. |
| 9,193,533 B2 | 11/2015 | Fourney |
| 9,199,802 B2 | 12/2015 | Neiser et al. |
| 9,216,862 B2 | 12/2015 | Wallace et al. |
| 9,227,785 B2 | 1/2016 | Chinnock et al. |
| 9,233,803 B2 | 1/2016 | Pilarz et al. |
| 9,254,930 B2 | 2/2016 | Cremer |
| 9,290,333 B2 | 3/2016 | Skanse et al. |
| 9,302,855 B2 | 4/2016 | Guernsey et al. |
| 9,309,054 B2 | 4/2016 | Scates |
| 9,309,058 B2 | 4/2016 | Maglaty |
| 9,315,341 B2 | 4/2016 | Ieist |
| 9,327,916 B2 | 5/2016 | DeRoche |
| 9,334,113 B2 | 5/2016 | Naylor |
| 9,340,357 B2 | 5/2016 | Wilkins et al. |
| 9,371,194 B2 | 6/2016 | Ragan |
| 9,399,558 B2 | 7/2016 | Guernsey et al. |
| 9,409,727 B2 | 8/2016 | German |
| 9,428,338 B2 | 8/2016 | Ragan |
| 9,434,547 B2 | 9/2016 | Marshall et al. |
| 9,452,896 B2 | 9/2016 | Lee |
| 9,457,961 B2 | 10/2016 | Green, III |
| 9,463,931 B2 | 10/2016 | Nagel et al. |
| 9,469,486 B2 | 10/2016 | German |
| 9,471,009 B2 | 10/2016 | Kikuchi et al. |
| 9,481,516 B1 | 11/2016 | Kraus et al. |
| 9,493,308 B2 | 11/2016 | Hoynash et al. |
| 9,493,313 B2 | 11/2016 | Vegh |
| 9,499,346 B2 | 11/2016 | Triensenberg et al. |
| 9,555,972 B2 | 1/2017 | Ishikawa et al. |

(56) References Cited

U.S. PATENT DOCUMENTS

| | | |
|---|---|---|
| 9,555,976 B2 | 1/2017 | Eure et al. |
| 9,567,164 B2 | 2/2017 | Kirkpatrick et al. |
| 9,573,772 B2 | 2/2017 | Fourney |
| 9,586,763 B2 | 3/2017 | Reischl |
| 9,592,983 B2 | 3/2017 | Costanzo et al. |
| 9,624,043 B2 | 4/2017 | Koetje et al. |
| 9,630,784 B2 | 4/2017 | Ragan |
| 9,741,009 B2 | 8/2017 | Berghorn et al. |
| 9,745,143 B2 | 8/2017 | Wilkins |
| 9,751,695 B2 | 9/2017 | DeGroot et al. |
| 9,776,800 B2 | 10/2017 | Westergaard Andersen |
| 9,776,806 B2 | 10/2017 | Reischl |
| 9,815,632 B2 | 11/2017 | DePaso et al. |
| 9,828,187 B2 | 11/2017 | Chierego et al. |
| 9,878,856 B2 | 1/2018 | Specht |
| 9,988,218 B2 | 6/2018 | Dugat et al. |
| 10,221,020 B2 | 3/2019 | Menke et al. |
| 10,239,704 B2 | 3/2019 | Messner |
| 10,532,894 B2 | 1/2020 | Kuhn |
| 10,640,303 B2 | 5/2020 | Kuhn |
| 11,130,643 B2 | 9/2021 | Lundahl et al. |
| 11,235,356 B2 | 2/2022 | Lundahl et al. |
| 11,247,849 B2 | 2/2022 | Kuhn et al. |
| 2001/0014190 A1 | 8/2001 | Ledingham |
| 2004/0007439 A1 | 1/2004 | Wolkerstorfer |
| 2004/0201160 A1 | 10/2004 | Nakashima |
| 2005/0155846 A1 | 7/2005 | Sofranec et al. |
| 2006/0038452 A1 | 2/2006 | Lesak |
| 2006/0076216 A1 | 4/2006 | Wagner et al. |
| 2006/0219526 A1 | 10/2006 | Costanzo et al. |
| 2006/0225284 A1 | 10/2006 | Byerly et al. |
| 2006/0260917 A1 | 11/2006 | Ozaki et al. |
| 2007/0007108 A1 | 1/2007 | Veit |
| 2007/0119690 A1 | 5/2007 | Lupton |
| 2008/0121498 A1 | 5/2008 | Costanzo |
| 2008/0302634 A1 | 12/2008 | Costanzo et al. |
| 2009/0008218 A1 | 1/2009 | Fourney |
| 2009/0039592 A1 | 2/2009 | Jans et al. |
| 2009/0152074 A1 | 6/2009 | Wolf |
| 2009/0314608 A1 | 12/2009 | Rogers et al. |
| 2010/0193329 A1 | 8/2010 | Wargo |
| 2011/0022221 A1 | 1/2011 | Fourney |
| 2011/0297509 A1 | 12/2011 | Taylor |
| 2012/0080290 A1 | 4/2012 | Fourney |
| 2012/0125735 A1 | 5/2012 | Schuitema et al. |
| 2012/0298481 A1 | 11/2012 | Fourney |
| 2012/0318644 A1 | 12/2012 | Maclachlan et al. |
| 2015/0026983 A1 | 1/2015 | Eure et al. |
| 2015/0144536 A1 | 5/2015 | Dugat |
| 2016/0039611 A1 | 2/2016 | Hoynash et al. |
| 2016/0114980 A1 | 4/2016 | Ishikawa et al. |
| 2016/0159581 A1 | 6/2016 | Fourney |
| 2016/0167885 A1 | 6/2016 | Westergaard Andersen |
| 2016/0200525 A1 | 7/2016 | Coullery |
| 2016/0257499 A1 | 9/2016 | Cribiu |
| 2016/0270562 A1 | 9/2016 | McPherson et al. |
| 2016/0288172 A1 | 10/2016 | Wargo |
| 2016/0325315 A1 | 11/2016 | Zimmer et al. |
| 2017/0034653 A1 | 2/2017 | Ambrefe |
| 2017/0066595 A1 | 3/2017 | Fourney |
| 2017/0144843 A1 | 5/2017 | Pedersen et al. |
| 2017/0330135 A1 | 11/2017 | Taylor et al. |
| 2017/0334661 A1 | 11/2017 | Stefanko et al. |
| 2017/0349383 A1 | 12/2017 | Myers et al. |
| 2019/0185272 A1 | 6/2019 | Fumagalli et al. |
| 2022/0395864 A1 | 12/2022 | Lundahl et al. |

FOREIGN PATENT DOCUMENTS

| | | |
|---|---|---|
| CN | 102849449 A | 1/2013 |
| CN | 205739576 U | 11/2016 |
| CN | 110636981 A | 12/2019 |
| EP | 0068475 A2 | 1/1983 |
| EP | 0438667 A2 | 7/1991 |
| EP | 0560480 A2 | 9/1993 |
| GB | 1554539 A | 10/1979 |
| JP | 2005-138918 A | 6/2005 |
| JP | 2009-292601 A | 12/2009 |
| JP | 2012/121693 A | 6/2012 |
| WO | WO 2006/121749 A1 | 11/2006 |
| WO | WO 2018/165489 A1 | 9/2018 |
| WO | WO 2018/165609 A1 | 9/2018 |
| WO | WO 2019/104095 A2 | 5/2019 |

OTHER PUBLICATIONS

International Search Report and Written Opinion from corresponding International Patent Application No. PCT/US2018/21842, dated Aug. 9, 2018, in 12 pages.

International Preliminary Report on Patentability from corresponding International Patent Application No. PCT/US2018/21842, dated Sep. 30, 2019, in 5 pages.

Office Action in corresponding Chinese Patent Application No. 201880006310.0, dated Aug. 24, 2020, in 31 pages.

Office Action in corresponding Chinese Patent Application No. 201880006310.0, dated May 17, 2021, in 15 pages.

Office Action in corresponding Chinese Patent Application No. 201880006310.0, dated Oct. 22, 2021, in 26 pages.

Partial Supplementary Search Report in corresponding European Patent Application No. 18764687.2, dated Dec. 22, 2020, in 19 pages.

Extended Search Report in corresponding European Patent Application No. 18764687.2, dated Apr. 1, 2021, in 19 pages.

Hairise, Wholesale Har2253 0 USD sample replacement parts transportation belt conveyor belt conveyor system belt, Alibaba.com, accessed in Nov. 2016, in 2 pages.

Hairise, Wholesale Side transfer universal ball modular plastic conveyor belt, Alibaba.com, accessed in Nov. 2016, in 6 pages.

Hairise, Wholesale 2253 flexible universal ball belt, Alibaba.com, accessed in Nov. 2016, in 4 pages.

Hairise, Wholesale Buy Best from Wholesaler Alibaba.com, accessed in Nov. 2016, in 2 pages.

Power Transmission Solutions, "ModSort™ Station Solves Transfer and Division," YouTube video, Oct. 2016, title page in 2 pages and screenshots in 41 pages.

Power Transmission Solutions, "System Plast 2253 Roller Top Belt for Unit Handling," YouTube video, Mar. 2015, title page in 2 pages and screenshots in 46 pages.

System Plast ModSort Right Angle Transfer Module Brochure, 2016.

Regal to Launch Modsort at Pack Expo., Sep. 2016.

BCK Holland B.V., "Two diverter belts under one ball chain" video—YouTube, https://www.youtube.com/watch?v=Mdfc7sDR0FY, Mar. 14, 2012, in 4 pages.

System Plast S.R.L., "Designed for Diversity Multidirectional Roller Top Belt Series 2253 RT," Appendix to general Engineering Manual, MCB11019E, Form 22662E, printed in Italy, Oct. 2011, in 4 pages.

Tsubakimoto Chain Co., Tsubaki O-Carry Conveyor catalog, Aug. 2009, in 6 pages.

\* cited by examiner

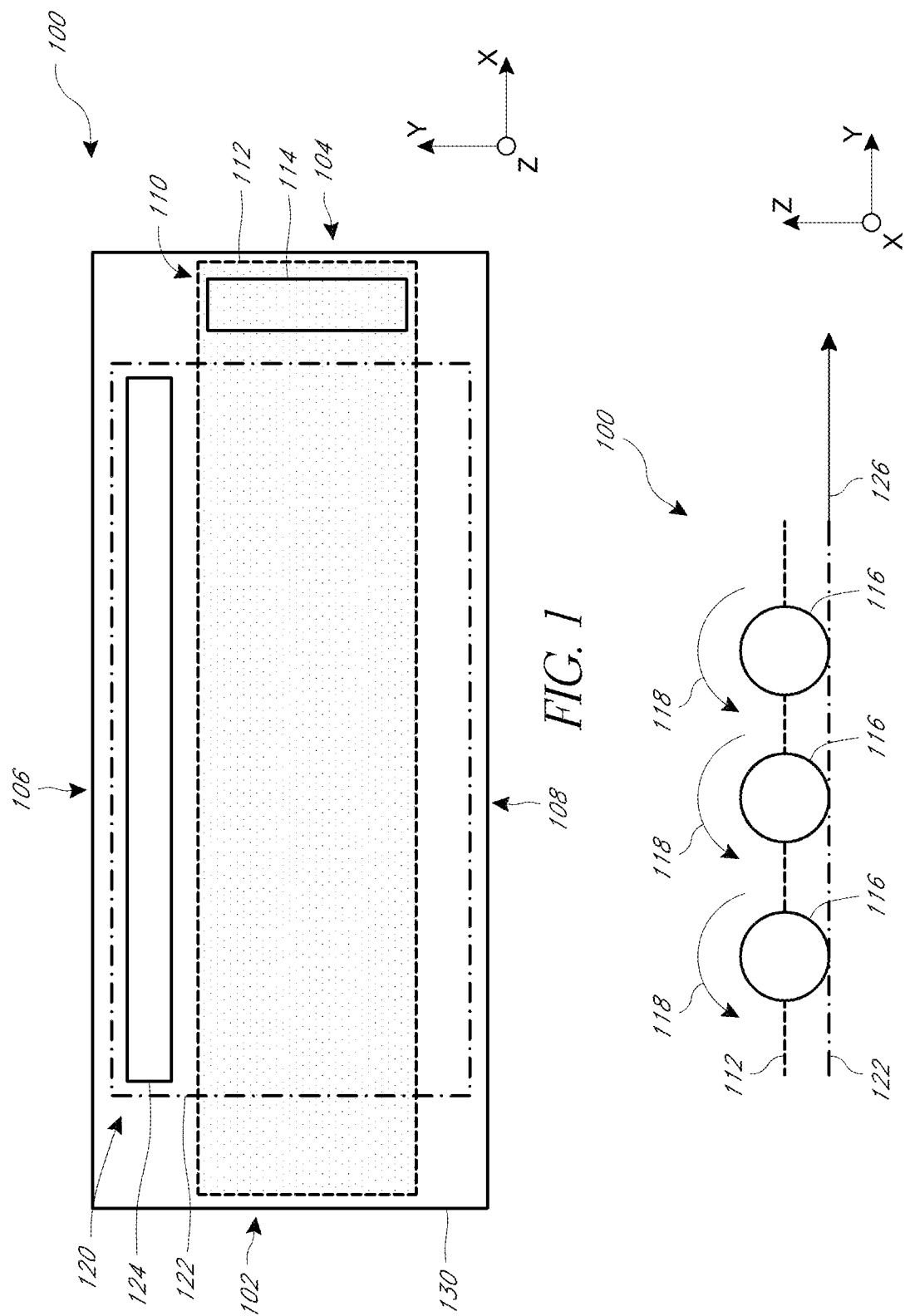

MODULAR TRANSFER UNITS, SYSTEMS, AND METHODS

CROSS REFERENCE

This application is a continuation of U.S. patent application Ser. No. 16/732,592, filed Jan. 2, 2020, now U.S. Pat. No. 11,247,849, which is a continuation of U.S. patent application Ser. No. 15/916,187, filed Mar. 8, 2018, now U.S. Pat. No. 10,532,894, which claims the priority benefit under at least 35 U.S.C. § 119 of U.S. Patent Application No. 62/470,068, filed Mar. 10, 2017; U.S. Patent Application No. 62/470,760, filed Mar. 13, 2017; and U.S. Patent Application No. 62/479,920, filed Mar. 31, 2017. Each of the aforementioned applications are hereby incorporated by reference herein in their entirety.

BACKGROUND

Field

The present disclosure relates to systems and methods for conveying goods from a first location to a second location. More specifically, some aspects of the present disclosure relate to modular conveyor components that can transfer goods to other components of a conveyor system.

Description of Certain Related Art

Conveyors can be used in various commercial and manufacturing applications to transport objects between different processing stations and locations. A conveyor typically includes a conveyor belt or chain that is arranged in an endless loop and driven to transport the objects on the belt or chain surface along a generally horizontal path.

SUMMARY OF CERTAIN FEATURES

This disclosure encompasses various embodiments of modular transfer units, systems, and methods. In some embodiments, the embodiments are configured to transfer packages from one conveyor belt to another. In some embodiments, the modular transfer unit (also called a divert unit or a sorter station) allows effective sortation of a wide range of packages. Some embodiments can solve the issue of having problems diverting problematic packages, such as certain small, soft, and/or unusually shaped packages. A need to be able to convey and divert such problematic packages can be beneficial. For example, market changes in e-commerce have led to a need to be able to divert a wider range of package types. A particular need is present for conveying and sorting of polybags, which are typically non-rigid bags that articles are placed into for shipment.

Some embodiments disclosed require no vertical lift (e.g., in the z-direction parallel with a vertical axis) to perform the divert and/or require no moving components external to the belt to directly contact the goods. For example, some embodiments do not require vertical movement of a component to conduct a sortation procedure. Some embodiments disclosed allow sorting of products without the use of a pusher, compressed air, or z-axis direction lift mechanism. Some embodiments include low voltage and/or torque output, which can allow for safe operating conditions near personnel from moving parts and excessive noise. Some embodiments run on demand, which can allow for shut down when no product is present to save energy and diminish noise.

Certain embodiments include a plurality of rollers, such as at least one motorized roller and at least one idler roller, at least one main belt, at least one transfer belt, one or more controls, and one or more sensors (e.g., optical sensors or "photo-eyes") to arrive at a completely modular and safe method of diverting a wide range of products without the need for vertical lift of z-axis mechanism and without the need for compressed air. Some variants include sufficiently small spacing between rollers (e.g., spheres) to allow for very small packages to be diverted (e.g., spheres are less than or equal to about 1" apart center-to-center). Some implementations make use of 24 VDC motors and controls, which can allow for an easy and user friendly installation and commissioning.

BRIEF DESCRIPTION OF THE DRAWINGS

These and other features, aspects and advantages are described below with reference to the drawings, which are intended to illustrate embodiments of modular transfer systems including embodiments of various conveyor systems which utilize modular transfer systems.

FIG. 1 is a top-down schematic of an embodiment of a modular transfer unit.

FIG. 2 is a partial cross-sectional schematic of the modular transfer unit of FIG. 1.

DETAILED DESCRIPTION OF CERTAIN EMBODIMENTS

Figure 3:
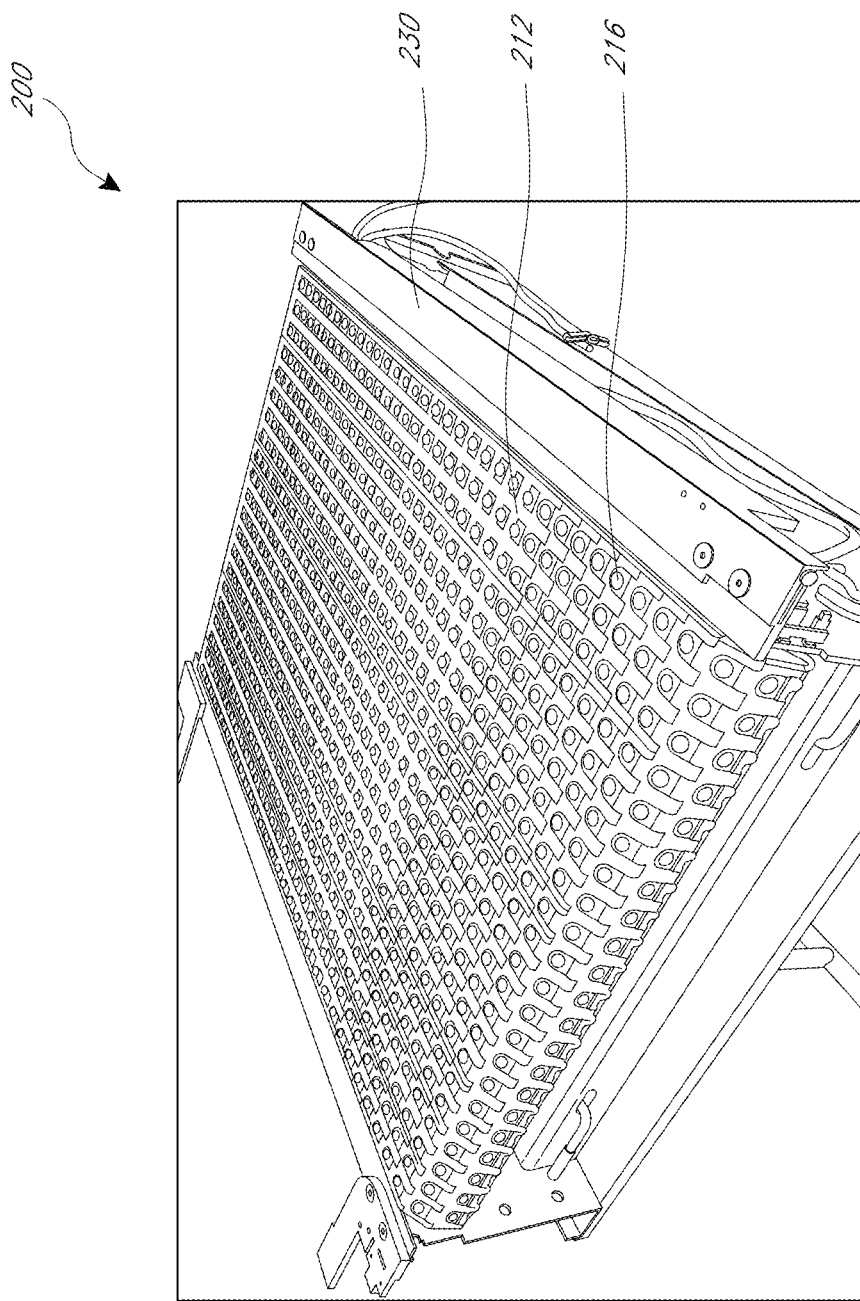
FIG. 3 is a perspective view of an embodiment of a modular transfer unit.

Certain terminology may be used in the following description for the purpose of reference only, and thus are not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

The modular transfer units described herein can be utilized in a conveyor system which can have other conveying devices, such as belted conveyors and/or roller conveyors, which can convey packages as well as receptacles which can receive the conveyed packages at desired locations. The modular transfer units may be self-contained devices which beneficially allow the modular transfer unit to be selectively used in or removed from a conveyor system, or moved around a conveyor system on an as-needed basis. The modular transfer units may be stand-alone devices (e.g., self-supporting and/or not physically secured to other components of the conveyor system). The modular transfer units described herein can have a rectangular shape with four sides. This geometry which may allow the modular transfer unit to be more widely implemented in current commercial conveyor systems. However, it is to be understood that the modular transfer unit can have different shapes with a different number of sides (e.g., pentagon with five sides, hexagon with six sides, circular, etc.).

The modular transfer units described herein can receive packages from other components of a conveyor system. In some embodiments, the modular transfer unit can allow the package to "pass through" the modular transfer unit such that the package is allowed to continue along its "primary flow path". That is, the modular transfer unit conveys the package to a component of the conveyor system which is positioned opposite of the component from which the modular transfer unit received the package. This may occur with little to no change in direction for the package. In some embodiments, the modular transfer unit can divert the package from this "primary flow path". That is, the modular transfer unit redirects the package to a component of the conveyor system which is not positioned opposite of the component from which the modular transfer unit received the package. This may occur with a significant change in direction for the package. For example, as will be shown in the embodiments below, this may cause a generally perpendicular (e.g., about 90 degree) shift in direction for the package; however, it is to be understood that lower degrees of shift (e.g., less than or equal to about: 30 degrees, 45 degrees, 60 degrees, 75 degrees, 90 degrees, etc.) are contemplated.

For purposes of this disclosure, the modular transfer units will be described as having a single infeed side, a single pass-through side, and one or more divert sides. This would be applicable in circumstances in which the modular transfer unit is utilized in a conveyor system which provides packages to the modular transfer unit at a single location. However, it is to be understood that the modular transfer unit can be utilized in conveyor systems having other configurations and which may provide packages to the modular transfer unit at multiple locations. In such circumstances, the modular transfer unit can have multiple infeed sides. Moreover, the pass-through sides may be a divert side or vice versa (depending on the specific location at which the modular transfer unit receives a package).

While the present description sets forth specific details of various embodiments, it will be appreciated that the description is illustrative only and should not be construed in any way as limiting. Additionally, although particular embodiments may be disclosed or shown in the context of conveyor systems which convey packages, it is to be understood that the systems described herein can be utilized with any other types of items, goods or articles. As such, the terms packages, articles, goods, and items may be used interchangeably. For example, any component, structure, step, method, or material that is illustrated and/or described in one embodiments can be omitted or can be used with or instead of any component, structure, step, method, or material this is illustrated and/or described in another embodiment.

Example Embodiments of a Modular Transfer Unit

With reference to FIGS. 1 and 2, a schematic of a modular transfer unit 100 is illustrated. With reference first to FIG. 1, the modular transfer unit 100 can have an infeed side 102 at which the modular transfer unit 100 can receive one or more packages from a conveyor system. In some implementations, the modular transfer unit 100 can be attached to components of a conveyor system which deliver the packages to the infeed side 102 of the modular transfer unit 100. The modular transfer unit 100 can allow packages to pass through the modular transfer unit 100 in a primary flow path (e.g., in a direction along the x-axis). The modular transfer unit 100 can have a pass-through side 104 at which the modular transfer unit 100 can discharge packages which are intended to be passed through the modular transfer unit 100. In some implementations, the modular transfer unit 100 can be attached to components of a conveyor system which receive the packages discharged from the pass-through side 104.

The modular transfer unit 100 can redirect or divert packages from the primary flow path. The modular transfer unit 100 can have a first divert side 106 and/or a second divert side 108 at which the modular transfer unit 100 can discharge packages which are intended to be diverted by the modular transfer unit 100. In some implementations, the first divert side 106 and/or the second divert side 108 of the modular transfer unit 100 can be attached to components of a conveyor system which receive the packages which have been diverted from the primary flow path of the conveyor system.

The modular transfer unit 100 can include a first conveyance system 110 and a second conveyance system 120. The first conveyance system 110, which can be a primary flow system, can move packages along a direction of the primary flow path (e.g., in a direction along the x-axis). As shown, the primary flow system 110 can include a primary flow belt 112 (also called a main belt). The primary flow belt 112 can extend between the infeed side 102 and the pass-through side 104 of the modular transfer unit 100. The primary flow system 110 can include a driver 114, such as a motor, which can be directly coupled to the primary flow belt 112 or indirectly coupled via one or more intermediate components, such as gears. The driver 114 can move the primary flow belt 112 in a direction from the infeed side 102 to the pass-through side 104 of the modular transfer unit 100. In some embodiments, the driver 114 can move the primary flow belt 112 in a direction from the pass-through side 104 to the infeed side 102 of the modular transfer unit 100. The driver 114 can be reversible or intermediate components between the driver 114 and the primary flow belt 112 can allow the driver 114 to drive the primary flow belt 112 in reverse.

In some embodiments, the primary flow belt 112 can be a roller-top belt, such as, the 2253RT belt (available from System Plast S.r.l.). The primary flow belt can include any feature or combination of features that are the same, or similar to, those described in U.S. Pat. No. 7,021,454, issued Apr. 4, 2006, which is incorporated herein by reference in its entirety. In some embodiments, the primary flow belt 112 can have a length, measured from the infeed side 102 to the pass-through side 104 of between about 30" to about 42". The primary flow belt 112 can have a width, measured in the conveying plane and generally orthogonal to the length, of between about 16" to about 34". The driver 114 can be coupled to the primary flow belt 112 via a roller or other torque transmission feature. The primary flow belt 112 can comprise a plurality of interconnected modules, such as plastic belt modules comprising a body and a movable component. Modules that are adjacent to each other in the conveying direction can be hingedly connected, such as with a hinge pin.

With continued reference to FIG. 1, the second conveyance system 120, which can be a divert system, can move packages in a direction which is non-parallel to the primary flow path of the conveyor system. For example, the divert system can move packages in a direction not parallel to the x-axis. As shown in the illustrated embodiment, the diverter system 120 can move packages in a direction which is generally orthogonal to the primary flow path of the conveyor system (e.g., the diverter system 120 can move packages in a direction along the y-axis).

The diverter system 120 can include a diverter belt 122. The diverter belt 122 can extend from the first divert side 106 and/or the second divert side 108 of the modular transfer unit 100. The diverter belt 122 can overlap at least partially with the primary flow belt 112. The diverter system 120 can include a driver 124, such as a motor, which can be directly coupled to the diverter belt 122 or indirectly coupled via one or more intermediate components, such as gears. The driver 124 can move the diverter belt 122 in a direction from the second divert side 108 to the first divert side 106 of the modular transfer unit 100. In some embodiments, the driver 124 can move the diverter belt 122 in a direction from the first divert side 106 to the second divert side 108 of the modular transfer unit 100. The driver 124 can be reversible or intermediate components between the driver 124 and the diverter belt 122 can allow the driver 124 to drive the diverter belt 122 in reverse.

In some embodiments, the diverter belt 122 comprises a non-modular belt, such as a fabric conveyor belt. In certain embodiments, the diverter belt 122 can be a Habasit NSW-5ELAV. In some variants, the diverter belt 122 comprises a plurality of interconnected modules, such as plastic belt modules. Modules that are adjacent each other in the conveying direction can be hingedly connected, such as with a hinge pin. The driver 124 can be coupled to the diverter belt 122 via a roller. In some implementations, the roller can be a 1.9" diameter roller.

With continued reference to FIG. 1, the modular transfer unit 100 can include a frame 130 which can be used to support one or more components of the modular transfer unit 100. For example, as shown in the illustrated embodiment, the frame 130 can support components of the primary flow system 110 and the diverter system 120. As such, the modular transfer unit 100 can be a standalone, self-contained system capable of operating separately from a conveyor system. In some implementations, the housing 130 can be sized to fit between components of a conveyor system. This can beneficially allow the modular transfer unit 100 to be implemented on an as-needed basis in a conveyor system. In doing so, the modular transfer unit 100 can be swapped from one position in a conveyor system to another position in the conveyor system depending on the needs of the operator. In some implementations, the housing 130 can be sized to be retrofitted to existing conveyor systems.

In some embodiments, the electronics of the modular transfer unit 100 can be run at low voltages. In some instances, this can allow the modular transfer unit 100 to be utilized without running electrical wires through a rigid conduit (e.g., electrical metallic tubing) thereby reducing overall complexity and costs for the modular transfer unit 100. In some embodiments, the electronics of the modular transfer unit 100 are configured to operate at low voltages, such as at or below about 50V. In some embodiments, the electronics of the modular transfer unit 100 are configured to operate at voltages of approximately 24V or less.

With reference next to FIG. 2, a schematic of the primary flow belt 112 and the diverter belt 122 of the modular transfer unit 100 is illustrated. As shown, the primary flow belt 112 can be positioned above the diverter belt 122 with movable components 116 of the primary flow belt 112 contacting the diverter belt 122. The movable components 116 can have one or more translational and/or rotational degrees of freedom. For example, the movable components 116 can be in the form of balls which provide three rotational degrees of freedom. As another example, the movable components 116 can be in the form of rollers which provide one degree of rotational freedom.

The movable components 116 can move in response to movement of the primary flow belt 112 and/or the diverter belt 122. As shown in the illustrated embodiment, the movable components 116 can rotate about the x-axis (represented by arrow 118) in response to translation of the diverter belt 122 in a direction along the y-axis (represented by arrow 126). A package (not shown) positioned on the primary flow belt 112 and contacting the movable components 116 could thereby translate in a direction along the y-axis. This can allow the diverter belt 122 to redirect or divert packages in a direction which is generally orthogonal to the primary flow path. In several embodiments, when the movable components 116 pass over the diverter belt 122, the movable components 116 are in continuous contact with the diverter belt 122. In some implementations, the diverter belt 122 is vertically fixed relative to the primary flow belt 112. For example, in some embodiments, the diverter belt 122 as a whole does not move up and down and/or into and out of engagement with the movable components 116. In some embodiments, the diverter belt 122 is maintained in constant contact with and/or is continuously engaged with (e.g., abutted against) at least one of the movable components 116, such as the protruding lower portion of at least one spherical ball. In certain embodiments, the primary flow belt 112 does not include one or more motors that rotate the movable components 116 relative to other of the movable components 116 and/or a base of the primary flow belt in which the movable components 116 are journaled.

While the modular transfer unit 100 was described as having a single infeed side 102, a single pass-through side 104, and two divert sides 106, 108, it is to be understood that fewer or greater number of sides may be used (e.g., five or more sides). Moreover, it is to be understood that the modular transfer unit 100 can include two infeed sides and two discharge/divert sides. For example, the modular transfer unit 100 may receive packages at sides 102, 106. Packages received at side 102 may be discharged at side 104 or diverted to side 108. Packages received at side 106 may be discharged at side 108 or diverted to side 104. The modular aspect of the modular transfer unit 100 can beneficially allow the modular transfer unit 100 to be implemented in a wide variety of conveyance systems.

Figure 4:
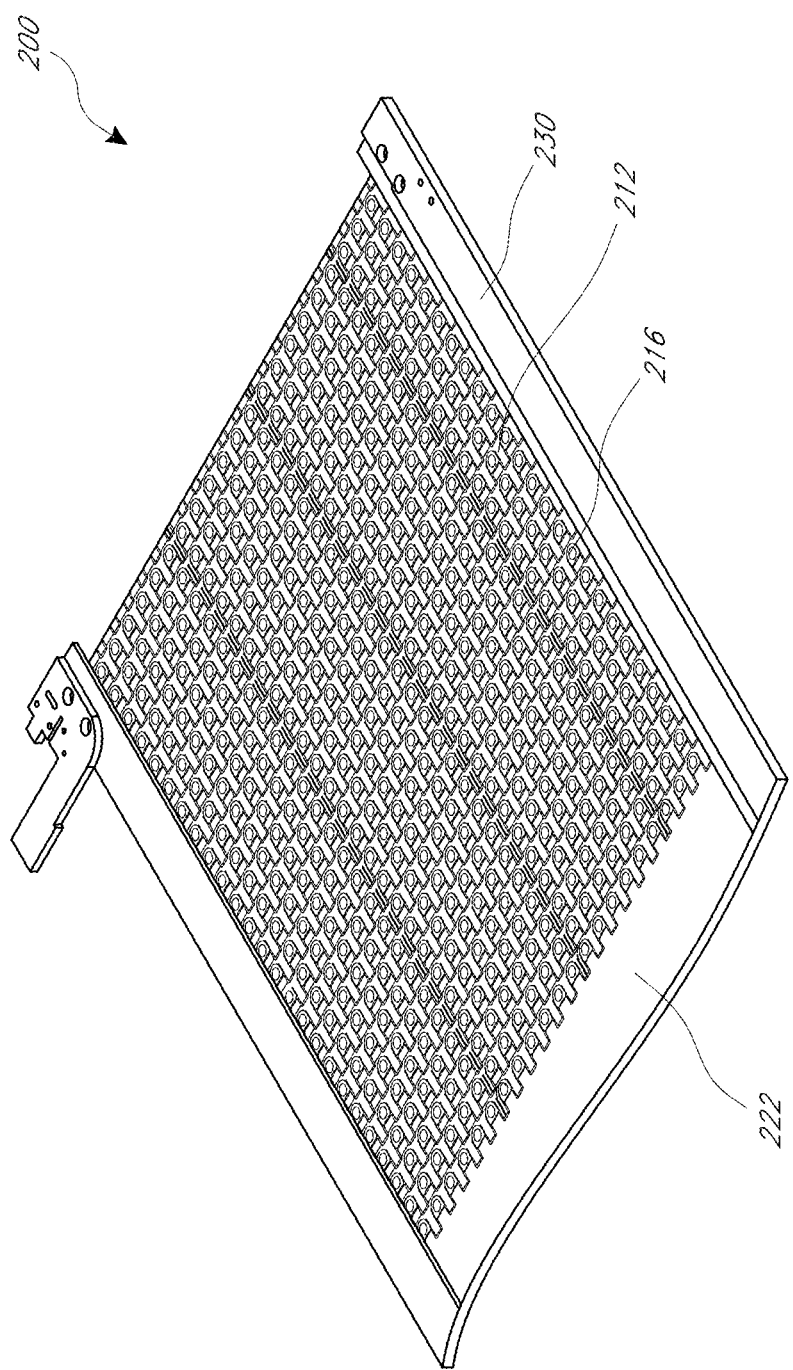
FIG. 4 is a partial, cut-away view of the modular transfer unit of FIG. 3.

With reference next to FIGS. 3 and 4, an embodiment of a modular transfer unit 200 is illustrated. The modular transfer unit 200 can include components, features, and/or functionality which are the same or similar to those of other modular transfer units described herein, such as modular transfer unit 100 described above.

With reference first to FIG. 3, the modular transfer unit 200 can include a primary flow belt 212. The primary flow belt 212 can comprise a modular conveyor belt, such as a belt made up hingedly-connected belt modules (e.g., links). The primary flow belt 212 can include multiple movable components 216 in the form of spherical balls. The primary flow belt 212 can be operated via one or more drivers, such as motorized rollers (not shown). Components of the modular transfer unit 200 can be supported by a frame 230. This can allow the modular transfer unit 200 to be swapped in and out of a conveyor system on an as-needed basis. With reference next to FIG. 4, the modular transfer unit 200 can include a diverter belt 222 positioned beneath the primary flow belt 212. The diverter belt 222 can run in a direction different from that of the primary flow belt 212. For example, the diverter belt 222 can run in a direction which is generally perpendicular to that of the primary flow belt 212.

Figure 5:
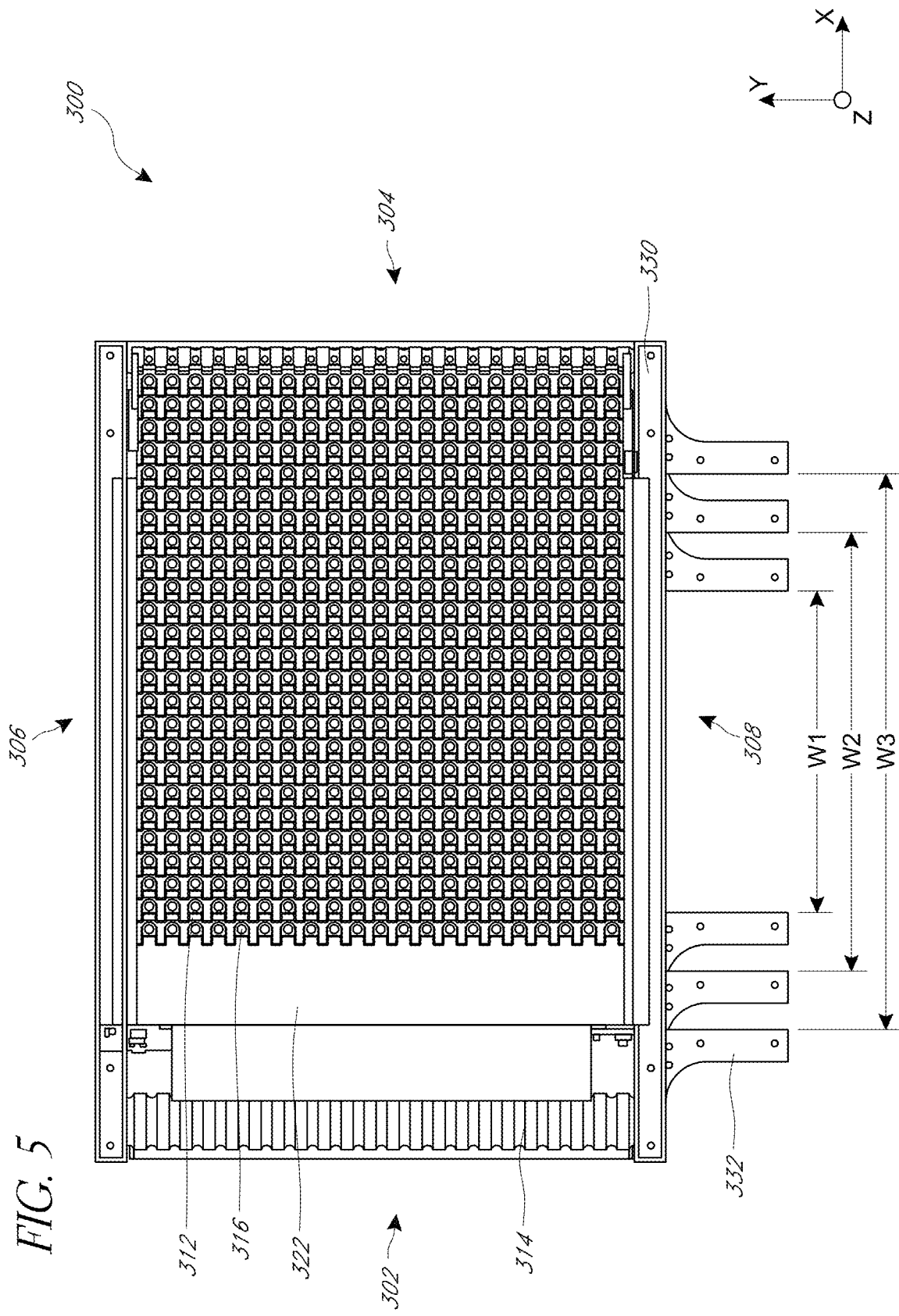
FIG. 5 is a top-down schematic of an embodiment of a modular transfer unit.
Figure 6:
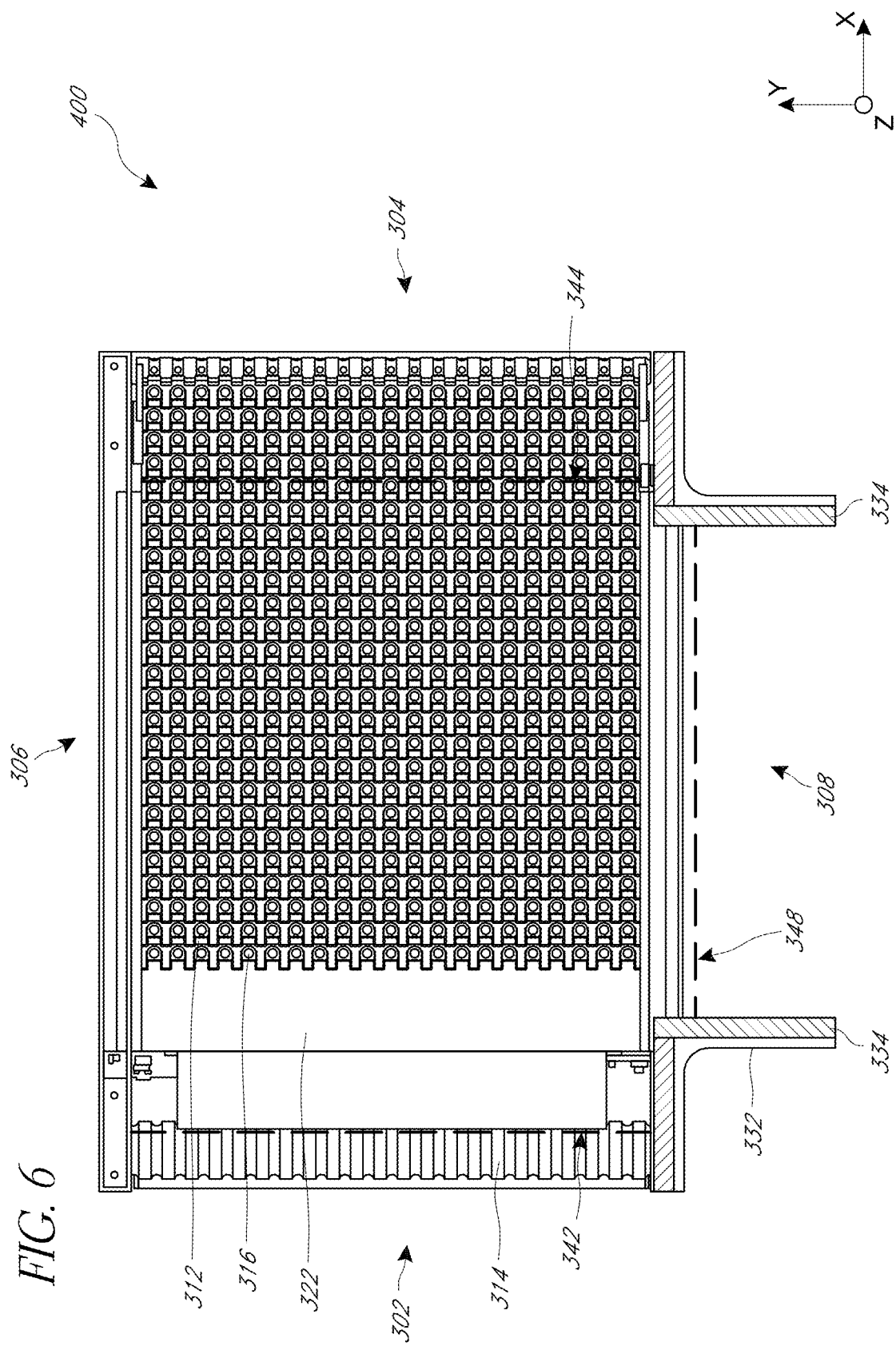
FIG. 6 is a top-down schematic of the modular transfer unit of FIG. 5 with different components.

With reference next to FIGS. 5 and 6, an embodiment of a modular transfer unit 300 is illustrated. The modular transfer unit 300 can include components, features, and/or functionality which are the same or similar to those of other modular transfer units described herein, such as modular transfer units 100, 200 described above.

As shown in the illustrated embodiment, the modular transfer unit 300 can have an infeed side 302 at which the modular transfer unit 300 can receive one or more packages (not shown) and a pass-through side 304 at which the modular transfer unit 300 can discharge these packages. Similar to the embodiments described above, the modular transfer unit 300 can redirect or divert packages away from the primary flow path from the infeed side 302 to the pass-through side 304. For example, the modular transfer unit 300 can divert packages towards a first divert side 306 or a second divert side 308 of the modular transfer unit 300.

The modular transfer unit 300 can include a primary flow belt 312 having multiple movable components 316 in the form of balls. The primary flow belt 312 can be operated via one or more drivers, such as motorized rollers 314. The modular transfer unit 300 can include a diverter belt 322 positioned beneath the primary flow belt 312. The diverter belt 322 can run in a direction different from that of the primary flow belt 312. For example, the diverter belt 322 can run in a direction which is generally perpendicular to that of the primary flow belt 312.

With continued reference to FIG. 5, components of the modular transfer unit 300 can be supported by a frame 330. This can allow the modular transfer unit 300 to be swapped in and out of a conveyor system on an as-needed basis. As shown, the frame 330 can include one or more interconnects 332, such as the illustrated flanges. In some embodiments, the interconnects 332 can be sized to attach to other components of a conveyor system (not shown). Although three pairs of interconnects 332 are shown, it is to be understood that a single pair can be used. The spacing between the interconnects 332 can be chosen to allow the modular transfer unit 300 to be coupled with other components of a conveyor system, such as a belted or roller take-away. In some embodiments, the interconnects 332 do not attach to other components of the conveyor system. In certain implementations, the modular transfer unit 300 is a stand-alone unit (e.g., is self-supporting and/or not physically secured to other components of the conveyor system).

The interconnects 332 may be removably coupled to the frame 330 and/or movable relative to the frame 330. This can beneficially allow the frame 330 to be utilized with a variety of different components of a conveyor system. For example, as shown in the illustrated embodiment, the interconnects 332 are shown on a second divert side 308 of the modular transfer unit 300 such that a component of the conveyor system can be connected to the second divert side 308. The first divert side 306 does not include any interconnects. In such a configuration, a sorting box may be positioned on the first divert side 306 of the modular transfer unit 300. It is to be understood that such interconnects 332 can be used along any portion of the modular transfer unit 300, such as the infeed side 302, the pass-through side 304, the first divert side 306 and/or second divert side 308.

With reference next to FIG. 6, the modular transfer unit 300 is shown with additional components attached thereto. The frame 330 can include one or more guide members 334, such as the illustrated L-shaped guides. The guide members 334 can beneficially ensure that packages traveling on the modular transfer unit 300 are properly aligned and positioned prior to transferring off of the modular transfer unit 300. Although one pair of guide members 334 is shown, it is to be understood that multiple pairs can be used.

The guide members 334 may be removably coupled to the frame 330 and/or movable relative to the frame 330. This can beneficially allow the guide members 334 to be utilized with a variety of different packages and/or components of a conveyor system. For example, as shown in the illustrated embodiment, the guide members 334 are shown on a second divert side 308 of the modular transfer unit 300. It is to be understood that such guide members 334 can be used along any portion of the modular transfer unit 300, such as the infeed side 302, the pass-through side 304, the first divert side 306, and/or the second divert side 308. As shown in the illustrated embodiment, the guide members 334 can be attached directly to the interconnects 332; however, it is to be understood that the guide members 334 can be standalone members.

As shown in the illustrated embodiment, the modular transfer unit 300 can include one or more detection zones, such as the infeed detection zone 342, pass-through detection zone 344, and second divert detection zone 348. In some embodiments, information pertaining to the detection zones can be relayed to a control system of the modular transfer unit 300 and/or a control system of other components of the conveyor system to which the modular transfer unit 300 is attached. This can allow the control system to control the operation of the modular transfer unit 300 based on the status of the packages on the modular transfer unit 300. For example, the infeed detection zone 342 can provide an indication that the modular transfer unit 300 has received a package at the infeed side 302 of the modular transfer unit 300. The pass-through detection zone 344 can provide an indication that the modular transfer unit 300 has discharged a package from the pass-through side 304 of the modular transfer unit 300. The second divert detection zone 348 can provide an indication that the modular transfer unit 300 has diverted and discharged a package from the second divert zone 308.

A fewer or greater number of detection zones can be utilized. For example, the modular transfer unit 300 can include a first divert detection zone (not shown) which can provide an indication that the modular transfer unit 300 has diverted and discharged a package from the first divert side 306. Additional detection zones may be utilized between the infeed side 302, the pass-through side 304, the first divert side 306, and/or the second divert side 308. This can beneficially enhance tracking and/or monitoring the status and/or location of the packages on the modular transfer unit 300.

As shown in the illustrated embodiment, the detection zones are one-dimensional (e.g., linear) in the plane of the primary flow belt 312 (e.g., the x-y plane). In some embodiments, the detection zones can be formed by a photo-eye. However, it is to be understood that other types of sensors can be utilized, such as optical sensors, electromagnetic sensors, weight sensors, and other types of sensors. Moreover, although the detection zones of the illustrated embodiment are linear in the plane of the primary flow belt 312, it is to be understood that the detection zones can be two-dimensional in the plane of the primary flow belt 312 and/or three-dimensional.

In some embodiments, the modular transfer unit 300 can include an on-board controller or PLC (not shown) to which information pertaining to the detection zones 342, 344, 348 can be relayed. This can beneficially allow the modular transfer unit 300 to further operate as a stand-alone unit. In some implementations, the on-board controller or PLC can be connected to the conveyor system to which the modular transfer unit 300 is attached. This can allow the modular transfer unit 300 to receive instructions from the conveyor system about specific packages being conveyed. Such instructions may include whether to allow the package to pass through the modular transfer unit 300 or to be diverted from the primary flow path of the conveyor system.

Figure 7:
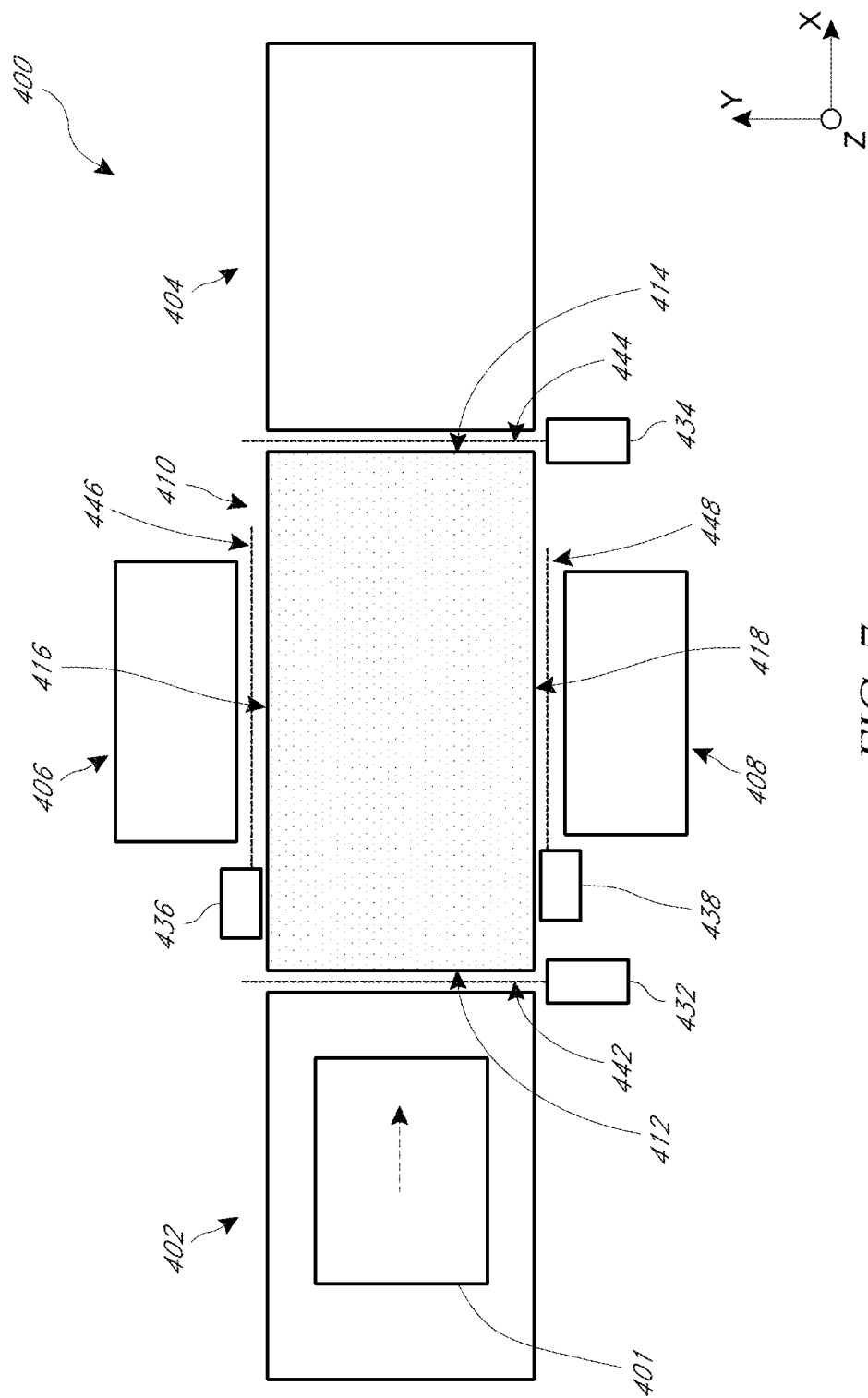
FIG. 7 is a top-down schematic of an embodiment of a conveyor system with a modular transfer unit with a package on a component of the conveyor system.
Figure 8:
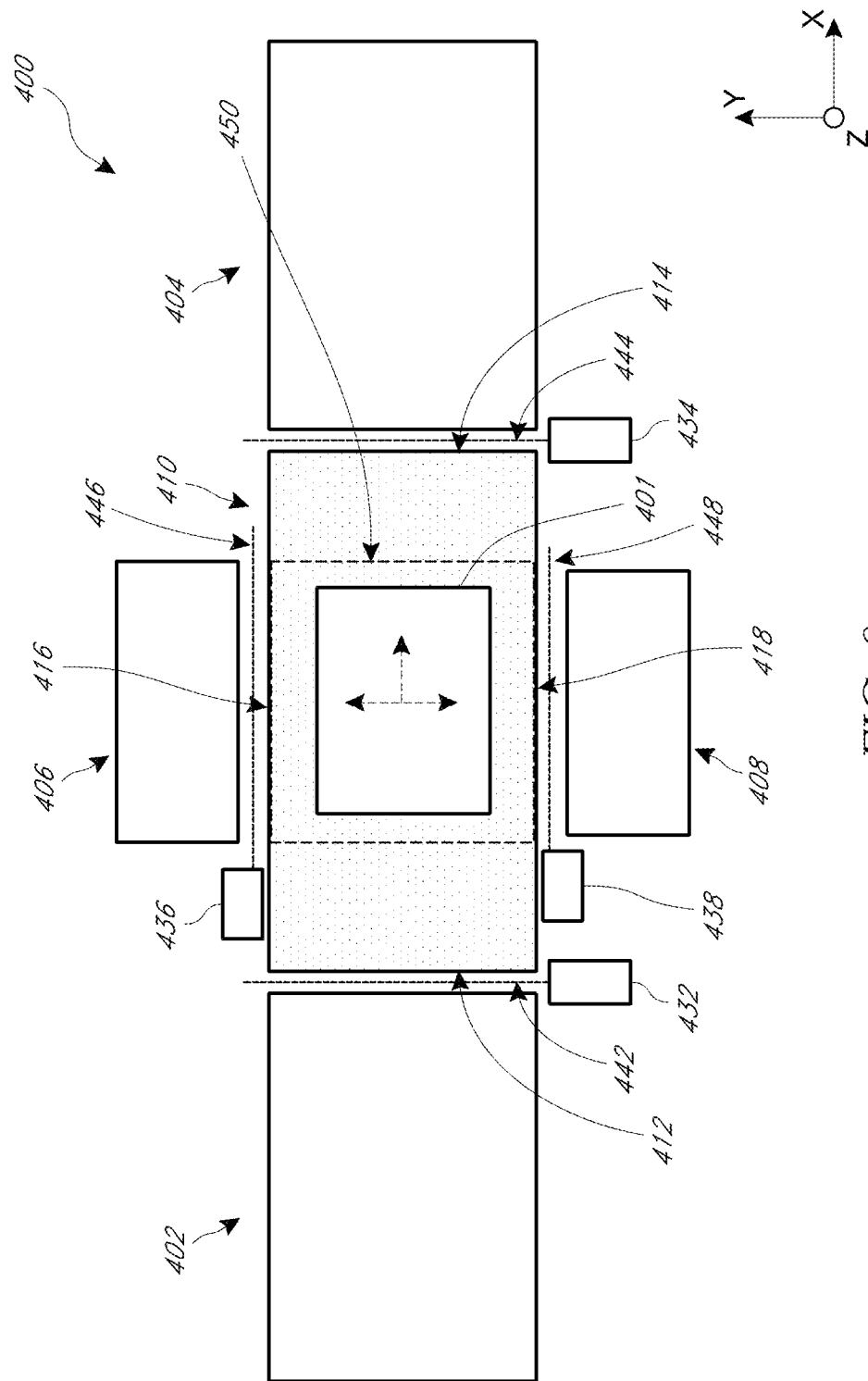
FIG. 8 is a top-down schematic of the conveyor system of FIG. 7, after a package has been conveyed to the modular transfer unit.

Example Embodiments of Conveyor System Configurations with a Modular Transfer Unit With reference to FIGS. 7 and 8, a schematic of a conveyor system 400 with a modular transfer unit 410 is illustrated. FIG. 7 shows a package 401 being conveyed along the conveyor system 400 along a primary flow path (e.g., along the x-axis) prior to the package 401 being received by the modular transfer unit 410. FIG. 8 shows the package 401 after being received by the modular transfer unit 410 prior to being diverted or passed through by the modular transfer unit 410. The modular transfer unit 410 can include components, features, and/or functionality which are the same or similar to those of other modular transfer units described herein, such as modular transfer units 100, 200, 300 described above.

With reference first to FIG. 7, the conveyor system 400 can include an inflow component 402 which can be positioned at or proximate an inflow side 412 of the modular transfer unit 410. The inflow component can be, for example, a belted or roller conveyor unit which can deliver the packages to the infeed side 412 of the modular transfer unit 410. The conveyor system 400 can include an outflow component 404 which can be positioned at or proximate a pass-through side 414 of the modular transfer unit 410. In some embodiments, the outflow component can be a belted or roller conveyor unit which can receive packages from the pass-through side 414 of the modular transfer unit 410 and convey such packages to another location (e.g., a belted or roller "take-away"). In some embodiments, the outflow component 404 can be a bin or other receptacle which can receive the package. The conveyor system 400 can include a first diverted component 406 and/or a second diverted component 408 which can be positioned at or proximate a first divert side 416 and/or second divert side 418 respectively of the modular transfer unit 410. In some embodiments, the first diverted component 406 and/or second diverted component 408 can be a belted or roller conveyor unit which can receive packages from the first divert side 416 and/or second divert side 418 respectively and convey such packages to another location. In some embodiments, the first diverted component 406 and/or second diverted component 408 can be a bin or other receptacle which can receive the package.

Although a gap is shown between components 402, 404, 406, 408 of the conveyor system 400 and the modular transfer unit 410, it is to be understood that the components can be positioned adjacent to and/or substantially flush with the modular transfer unit 410. In instances where a gap between one or more of the components 402, 404, 406, 408 of the conveyor system 400 and the modular transfer unit 410 exists, a device may be utilized to fill in the gap. For example, a plate may be positioned between one or more of the components 402, 404, 406, 408 of the conveyor system 400 and the modular transfer unit 410. As another example, a roller may be positioned between one or more of the components 402, 404, 406, 408 of the conveyor system 400 and the modular transfer unit 410. In some implementations, the roller may be unpowered (e.g., an idler roller); however, it is to be understood that the roller may be powered. This can allow the roller to advance the package between components of the conveyor system 400 and the modular transfer unit 410. A powered roller can be beneficial in instances where a package may potentially remain stagnant in the gap between the component of the conveyor system 400 and the modular transfer unit 410 exists.

As shown in the illustrated embodiment, the modular transfer unit 410 can include one or more detection zones formed by one or more sensors. As shown, the modular transfer unit 410 includes an infeed sensor 432 which establishes an infeed detection zone 442, a discharge sensor 434 which establishes a pass-through detection zone 444, a first divert sensor 436 which establishes a first divert detection zone 446, and/or a second divert sensor 438 which establishes a second divert detection zone 448. In some embodiments, the sensors can communicate with a control system of the modular transfer unit 410 and/or a control system of other components of the conveyor system to which the modular transfer unit 410 is attached. This can allow such a control system to control the operation of the modular transfer unit 410 based on the status of the packages on the modular transfer unit 410.

With continued reference to FIG. 7, the infeed detection zone 442 can provide an indication that the modular transfer unit 410 has received a package from the inflow component 402 of the conveyor system 400. As such, when the package 401 is conveyed from inflow component 402 of the conveyor system 400 to the modular transfer unit 410, as shown by the transition between FIG. 7 and FIG. 8, the modular transfer unit 410 can proceed with passing the package 401 through the modular transfer unit 410 to the outflow component 404 of the conveyor system 400 or diverting the package 401 to either the first diverted component 406 or the second diverted component 408 of the conveyor system 400.

With reference to FIG. 8, diversion of the package may occur at a "divert zone" 450, which is a position at which the package may be diverted and received by component 406 and/or component 408 of the conveyor system 400. As shown in the illustrated embodiment, the components 406, 408 of the conveyor system are arranged such that the modular transfer unit 410 can have a single divert zone 450; however, it is to be understood that the modular transfer unit 410 can have multiple divert zones. For example, multiple components (e.g., belted or roller "take-aways") may be positioned along one or both divert sides 416, 418. As another example, the positioning of components 406, 408 may only be partially aligned, or not aligned at all, such that each form separate divert zones.

The pass-through detection zone 444 can provide an indication that the modular transfer unit 410 has passed a package 401 through the modular transfer unit 410 and to the outflow component 404 of the conveyor system 400. The first divert detection zone 446 can provide an indication that the modular transfer unit 410 has diverted a package 401 to the first diverted component 406 of the conveyor system 400. The second divert detection zone 448 can provide an indication that the modular transfer unit 410 has diverted a package 401 to the second diverted component 408 of the conveyor system 400.

A fewer or greater number of detection zones can be utilized. For example, additional detection zones may be utilized between the infeed side 402, the pass-through side 404, the first divert side 406, and/or the second divert side 408. This can beneficially enhance monitoring the status/location of the packages on the modular transfer unit 410.

Although the detection zones 442, 444, 446, 448 are positioned between the components 402, 404, 406, 408 of the conveyor system 400 and the modular transfer unit 410, it is to be understood that one or more of these detection zones can be positioned along the modular transfer unit 410 (as shown, for example, in the embodiment of modular transfer unit 300 described in connection with FIG. 6). It is also to be understood that one or more of these detection zones can be positioned along components of the conveyor system 400.

As shown in the illustrated embodiment, the detection zones are one-dimensional (e.g., linear) in the plane of the conveyor system 400 (e.g., the x-y plane). In some embodiments, the detection zones can be formed by a photo-eye. However, it is to be understood that other types of sensors can be utilized, such as optical sensors, electromagnetic sensors, weight sensors, and other types of sensors. Moreover, although the detection zones of the illustrated embodiment are linear in the plane of the conveyor system 400, it is to be understood that the detection zones can be two-dimensional in the plane of the conveyor system 400 and/or three-dimensional.

Figure 9:
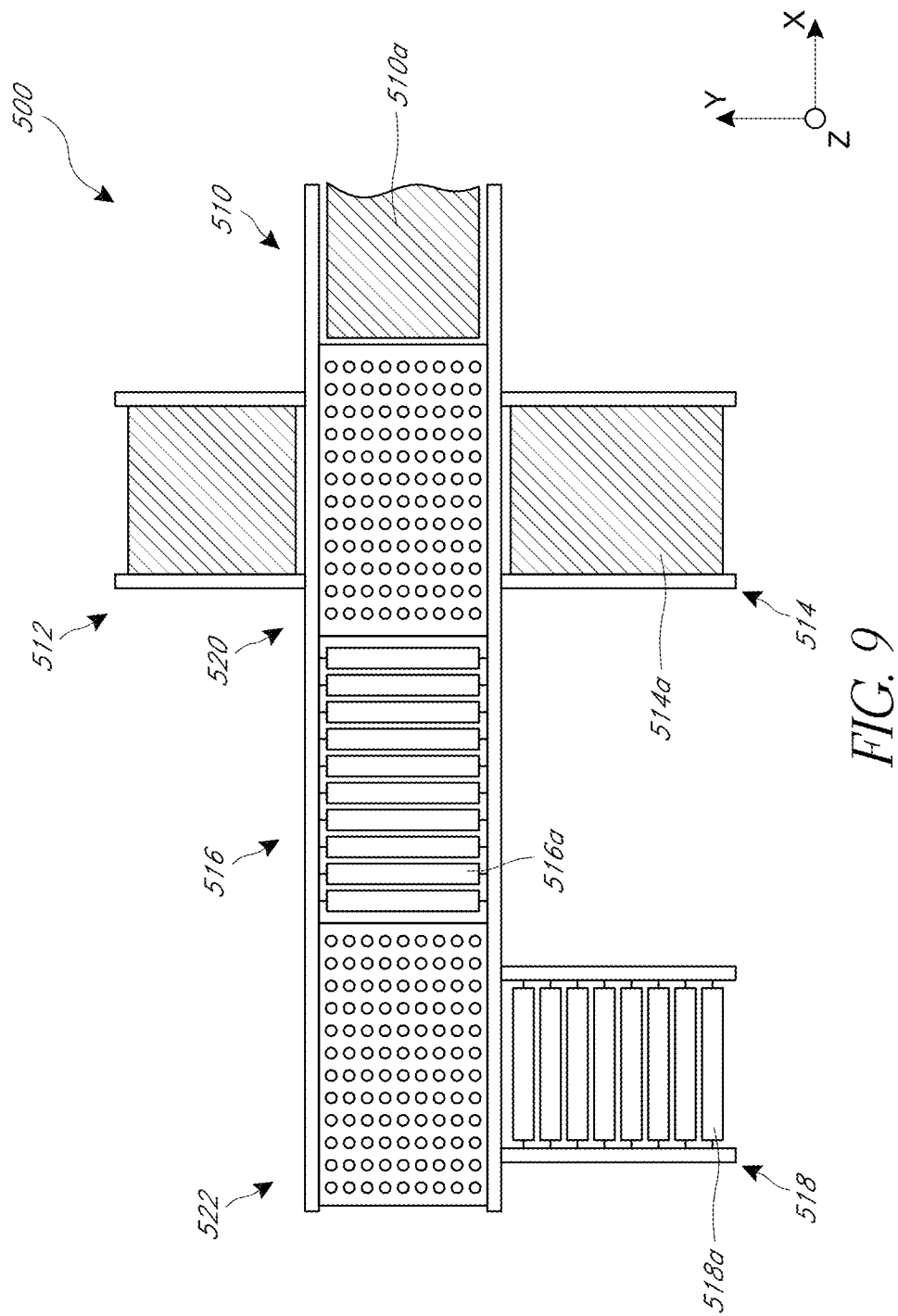
FIG. 9 is a top-down schematic of an embodiment of a conveyor system with multiple modular transfer units.

With reference next to FIG. 9, a schematic of a conveyor system 500 with multiple modular transfer units 520, 522 is illustrated. Modular transfer units 520, 522 can include components, features, and/or functionality which are the same or similar to those of other modular transfer units described herein, such as modular transfer units 100, 200, 300, 410 described above.

The conveyor system 500 can include multiple components which are positioned at or proximate the modular transfer units 520, 522. As shown in the illustrated embodiment, the conveyor system 500 can include conveyors 510, 512, 514 having belts 510a, 512a, 514a and conveyors 516, 518 having rollers 516a, 518a. In some embodiments, the belts 510a, 512a, 514a and/or rollers 516a, 518a can be powered to convey packages across the conveyors 510, 512, 514, 516, 518. However, it is to be understood that one or more of these components can be passive or unpowered. For example, the conveyors 516, 518 may be oriented with a downward slope such that packages can pass therethrough via gravity.

As shown in the illustrated embodiment, the conveyor 510 can be an inflow component positioned at or proximate an infeed side of the modular transfer unit 520. The conveyor 510 can deliver packages to the infeed side of the modular transfer unit 520. The conveyors 512, 514 can be first and second diverted components respectively which are positioned at or proximate a first and second divert side of the modular transfer unit 520. The conveyors 512, 514 can divert packages to other locations of the conveyor system 500.

The conveyor 516 can be an outflow component with respect to the modular transfer unit 520 and positioned at or proximate a pass-through side of the modular transfer unit 520. The conveyor 516 can be an inflow component with respect to the modular transfer unit 522 and positioned at or proximate an infeed side of the modular transfer unit 522. The conveyor 516 can deliver packages which are passed through the modular transfer unit 520 to the modular transfer unit 522. The conveyor 518 can be a diverted component which is positioned at or proximate a divert side of the modular transfer unit 522. As shown in the illustrated embodiment, in some implementations the conveyor system 500 may not have a corresponding outflow component for the modular transfer unit 522 or an additional diverted component. However, it is to be understood that such components may be added.

Figure 10:
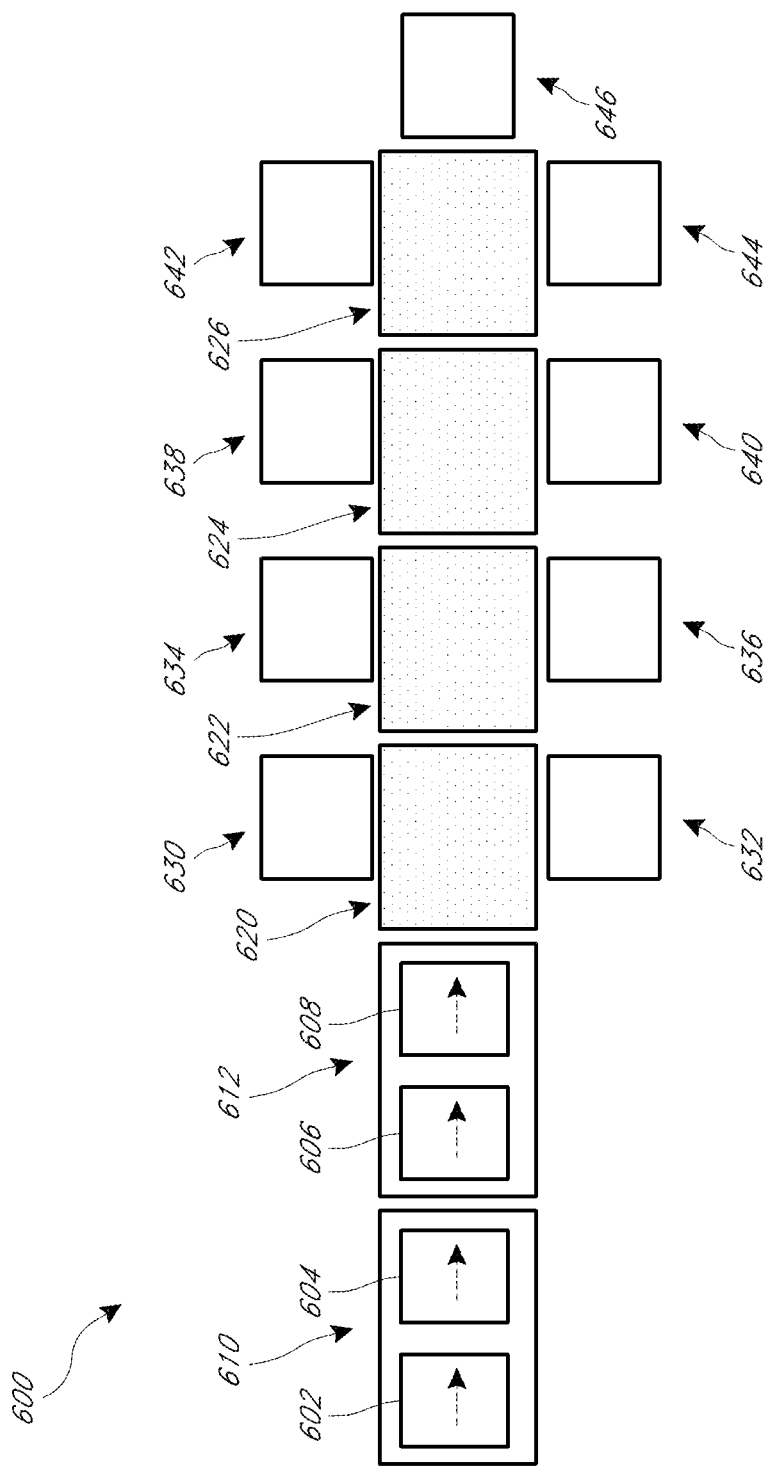
FIG. 10 is a top-down schematic of an embodiment of a conveyor system with multiple modular transfer units arranged serially.

With reference to FIG. 10, a schematic of a conveyor system 600 with multiple modular transfer units 620, 622, 624, 626 is illustrated. The modular transfer units 620, 622, 624, 626 can include components, features, and/or functionality which are the same or similar to those of other modular transfer units described herein, such as modular transfer units 100, 200, 300, 410, 520, 522 described above.

As shown in the illustrated embodiment, the conveyor system 600 can include conveyors 610, 612 arranged sequentially. Conveyor 612 can be an inflow component positioned at or proximate an infeed side of the modular transfer unit 620. Component 612 can deliver packages, such as packages 602, 604, 606, 608, to the infeed side of the modular transfer unit 620. As shown, the modular transfer units 620, 622, 624, 626 are arranged sequentially which can beneficially function as a compact sortation array. A package can sequentially pass through one or more of the modular transfer units 620, 622, 624, 626. At each modular transfer unit, a determination can be made by the modular transfer unit or the conveyor system 600 as to whether the package should be diverted into one of the bins, such as bins 630, 632, 634, 636, 638, 640, 642, 644, 646, adjacent to that modular transfer unit or whether the package should be passed through to the next modular transfer unit. Due to the modular nature of the modular transfer units 620, 622, 624, 626, this sortation array can be modified on-the-fly. For example, one or more modular transfer units can be added in the event that additional sortation is desired or one or more of the existing modular transfer units 620, 622, 624, 626 can be removed if less sortation is desired.

While bins are shown in FIG. 10, it is to be understood that other components, such as belted or roller conveyors, can be utilized in lieu of one or more of the bins.

Example Methods of Transferring a Package

Figure 11:
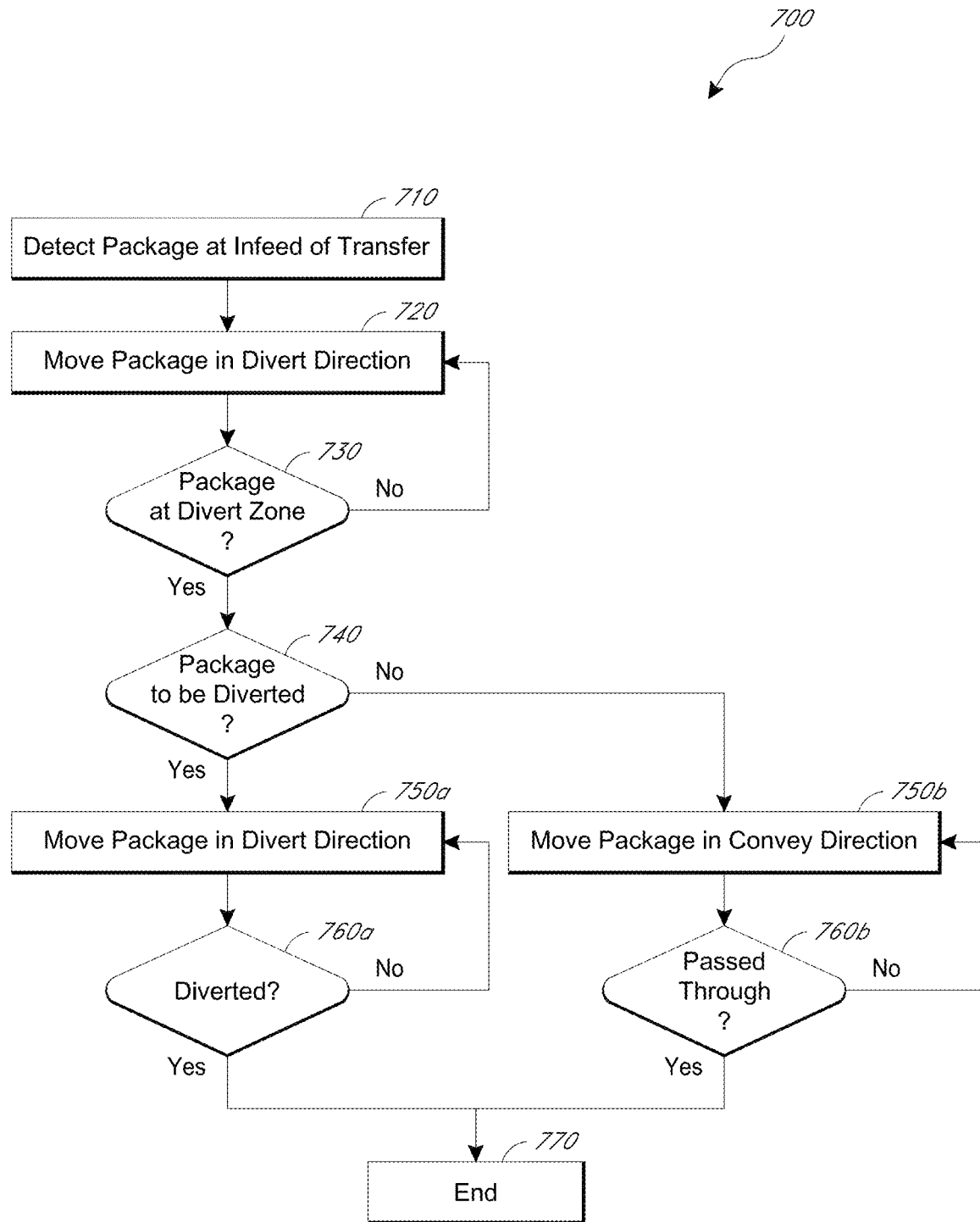
FIG. 11 is a flow diagram of an embodiment for transferring a package.

Referring now to FIG. 11, a flowchart of an embodiment of a method 700 for transferring a package using a modular transfer system, such as modular transfer systems 100, 200, 300, 410, 520, 522, 620, 622, 624, 626, is shown. In some embodiments, the system and method 700 is a stand-alone modular transfer unit, such as modular transfer units 100, 200, 300, 410, 520, 522, 620, 622, 624, 626 described above. For example, the method 700 can be implemented on a modular transfer unit without connecting the modular transfer unit to a conveyor system, such as conveyor systems 400, 500, 600 described above. In other embodiments, the method 700 can be implemented by a conveyor system. In some embodiments, the method 700 can be implemented by the modular transfer unit in conjunction with the conveyor system to which the modular transfer unit is attached. For purposes of the disclosure below, reference may be made to components of the conveyor system 400 and the modular transfer units 100 and 410 described above in connection with FIGS. 1, 2, 7, and 8. However, it is to be understood that this method can be implemented in any of the conveyor systems and/or modular transfer units described herein. Moreover, it is to be understood that in some embodiments, the method 700 may instead be performed by the modular transfer unit separately from the conveyor system.

The method 700 can start at block 710 where a modular transfer unit, such as modular transfer unit 410, detects a package at an infeed side of the modular transfer unit. The modular transfer unit can perform this process via receiving a signal from a sensor, such as infeed sensor 432, indicating the existence of a package within a detection zone, such as infeed detection zone 442, positioned at or proximate an infeed side of the modular transfer unit. For example, the system can transmit electrical signals to and from the infeed sensor via an interface which can be coupled, physically or wirelessly, to a controller or PLC of the modular transfer unit.

The method 700 can then move to block 720 where the modular transfer unit moves the package along a conveyance direction. In some embodiments, the conveyance direction can be along the primary flow path for the package. For example, with reference to the modular transfer unit 100 described in connection with FIGS. 1 and 2, the modular transfer unit 100 can moved the package in a direction along the primary flow path (e.g., along the direction of the x-axis) by operating the primary flow belt 112. However, it is to be understood that the modular transfer unit can operate other belts depending on the specific side at which the package is received. This may be implemented, for example, in instances where two or more sides of the modular transfer unit are "infeed" sides.

The method 700 can then move to block 730 where a determination is made as to whether or not the package is at a divert zone, such as divert zone 450 discussed in connection with FIG. 8. Should a determination be made that the package is not yet at the divert zone, the method 700 can move back to block 720 and further move the package in the conveyance direction. Should a determination be made that the package is at the divert zone, the method 700 can move to block 720 and further move the package in the conveyance direction.

In some embodiments, this determination can be made based on the amount of time which has elapsed after detection of the package at the infeed side of the modular transfer unit at block 710. For example, after detecting the package at infeed detection zone 442, a timer can commence when the package is being conveyed at block 720. Upon running the motor for a certain period of time, which may be pre-set from the factory or programmed by the operator, the modular transfer unit can assume that the package is now at the divert zone. In some implementations, the timer can begin after the package is no longer detected at the infeed detection zone which can signify that a trailing edge of the package has passed through the infeed detection zone. This can be beneficial in ensuring that the trailing edge is accounted for prior to being diverted. In some implementations, the timer can begin after the package is first detected at the infeed detection zone which can signify that a leading edge of the package has passed through the infeed detection zone. In some implementations, the timer can account for the amount of time which has passed between the package being detected and the package no longer being detected. In so doing, the timer can account for the size of the package. This can beneficially center the package along the divert zone.

In some embodiments, this determination can be made based on the operation of a driver, such as a motorized roller, after detection of the package at the infeed side of the modular transfer unit at block 710. For example, after detecting the package at infeed detection zone 442, the system can determine the amount of distance traveled by the primary flow belt based on operational parameters of the motorized roller (e.g., rotational speed or velocity). In some embodiments, the driver may be a pulse-width modulated ("PWM") motor and the system can determine operational parameters based on the amount of "pulses" sent to the PWM motor. Upon reaching a certain operational amount, which may be pre-set from the factory or programmed by the operator, the modular transfer unit can assume that the package is now at the divert zone.

In some implementations, the system can monitor operation of the driver after the package is no longer detected at the infeed detection zone which can signify that a trailing edge of the package has passed through the infeed detection zone. This can be beneficial in ensuring that the trailing edge is accounted for prior to being diverted. In some implementations, the system can monitor operation of the driver after the package is first detected at the infeed detection zone which can signify that a leading edge of the package has passed through the infeed detection zone. In some implementations, the system can take into account the size of the package. For example, the system can monitor the operation of the monitor at the time the package is first detected at the infeed detection zone until the package is no longer detected by the infeed detection zone. In so doing, the timer can account for the size of the package. This can beneficially center the package along the divert zone.

With continued reference to FIG. 11, the method 700 can then move to block 740 where a determination is made as to whether the package is to be diverted or is intended to be "passed through" or conveyed along the primary flow path. In some embodiments, a signal can be provided to the system providing information with respect to the package. This signal can be generated based on an indicator on the package including, but not limited to, electromagnetic devices such as NFC and RFID and/or printed codes such as a barcode or QR code. In some embodiments, this signal can be generated by user input. In some embodiments, the system can include two or more divert sides. In such embodiments, the signal providing information regarding whether to divert or pass through the package can further include information regarding the specific direction to divert the package.

If the package is to be diverted, the method 700 can move to block 750*a* and move the package in the divert direction. In some embodiments, the divert direction can be in a direction different from the primary flow path for the package. For example, with reference to the modular transfer unit 100 described in connection with FIGS. 1 and 2, the modular transfer unit 100 can moved the package in a direction along the primary flow path (e.g., along the direction of the y-axis) by operating the diverter belt 122. However, it is to be understood that the modular transfer unit can operate other belts depending on the specific side at which the package is received. This may be implemented, for example, in instances where two or more sides of the modular transfer unit are "divert" sides. In some embodiments, other belts of the system can be disabled as the package is diverted. This can be beneficial in instances where the primary flow belt and diverter belt, such as primary flow belt 112 and diverter belt 122, are oriented generally perpendicular relative to each other and a 90-degree transfer is desired.

If the package is not to be diverted, the method 700 can move to block 750*b* and move the package in the conveyance direction to be "passed through" the system. In some embodiments, the conveyance direction can be along the primary flow path for the package. For example, with reference to the modular transfer unit 100 described in connection with FIGS. 1 and 2, the modular transfer unit 100 can move the package in a direction along the primary flow path (e.g., along the direction of the x-axis) by operating the primary flow belt 112. However, it is to be understood that the modular transfer unit can operate other belts depending on the specific side at which the package is received. This may be implemented, for example, in instances where two or more sides of the modular transfer unit are "infeed" sides.

With continued reference to FIG. 11, in the event that the method 700 moved to block 750*a*, the method 700 can move to block 760*a* where a determination is made as to whether or not the package has been diverted and discharged from the system. Should a determination be made that the package has not yet been diverted and discharged, the method 700 can move back to block 750*a* and further move the package in the divert direction. Should a determination be made that the package has been diverted and discharged, the method 700 can move to block 770 where the method can end.

The modular transfer unit can perform this process via receiving a signal from a sensor, such as first and/or second divert sensors 436, 438, indicating the existence of a package within a detection zone, such as first and/or second divert zones 446, 448 positioned at or proximate divert sides of the system. For example, the system can transmit electrical signals to and from the divert sensor via an interface which can be coupled, physically or wirelessly, to a controller or PLC of the modular transfer unit. In some embodiments, this determination can be made after the package is no longer detected at the divert detection zone which can signify that a trailing edge of the package has passed through the divert detection zone.

In some embodiments, this determination can be made based on the amount of time which has elapsed after the divert operation commenced. For example, after running the diverter belt, a timer can commence when the package is being diverted. Upon running the motor for a certain period of time, which may be pre-set from the factory or programmed by the operator, the system can assume that the package has been discharged from the divert zone.

In some embodiments, this determination can be made based on the operation of a driver, such as a motorized roller, after the divert operation commenced. For example, after the divert operation commenced, the system can determine the amount of distance traveled by the primary flow belt based on operational parameters of the motorized roller (e.g., rotational speed or velocity). In some embodiments, the driver may be a pulse-width modulated ("PWM") motor and the system can determine operational parameters based on the amount of "pulses" sent to the PWM motor. Upon reaching a certain operational amount, which may be pre-set from the factory or programmed by the operator, the system can assume that the package has been discharged from the divert zone.

With continued reference to FIG. 11, in the event that the method 700 moved to block 750*b*, the method can move to block 760*b* where a determination is made as to whether or not the package has been passed through and discharged from the system. Should a determination be made that the package has not yet been passed through and discharged, the method 700 can move back to block 750*b* and further move the package in the conveyance direction. Should a determination be made that the package has been passed through and discharged, the method 700 can move to block 770 where the method can end.

The modular transfer unit can perform this process via receiving a signal from a sensor, such as discharge sensor 434, indicating the existence of a package within a detection zone, such as discharge zone 444 positioned at or proximate a pass-through side of the system. For example, the system can transmit electrical signals to and from the divert sensor via an interface which can be coupled, physically or wirelessly, to a controller or PLC of the modular transfer unit. In some embodiments, this determination can be made after the package is no longer detected at the discharge zone which can signify that a trailing edge of the package has passed through the discharge zone.

In some embodiments, this determination can be made based on the amount of time which has elapsed after the pass through operation commenced. For example, after running the primary flow belt, a timer can commence when the package is being passed through. Upon running the motor for a certain period of time, which may be pre-set from the factory or programmed by the operator, the system can assume that the package has been passed through and discharged from the discharge zone.

In some embodiments, this determination can be made based on the operation of a driver, such as a motorized roller, after the pass through operation commenced. For example, after the pass through operation commenced, the system can determine the amount of distance traveled by the primary flow belt based on operational parameters of the motorized roller (e.g., rotational speed or velocity). In some embodiments, the driver may be a pulse-width modulated ("PWM") motor and the system can determine operational parameters based on the amount of "pulses" sent to the PWM motor. Upon reaching a certain operational amount, which may be pre-set from the factory or programmed by the operator, the system can assume that the package has been discharged from the discharge zone.

In some embodiments, the system can be operated such that the method is performed fully for a package prior to performing the method for a subsequent package. In some embodiments, the system can be operated such that the method is performed partially for a package prior to performing the method for a subsequent package. For example, the system may be implementing block 750b on a first package and implementing block 720 on a second package.

It is to be understood that the steps of method 700 can be interchanged or repeated. For example, in embodiments where more than a single divert zone is present, step 740 may return to step 720 if a determination is made not to divert the package at a divert zone. This repetition may occur until the package has either been diverted or has reached the final divert zone. Moreover, it is to be understood that one or more of the steps of method 700 can be omitted. For example, in some embodiments, the method 700 can omit any of steps 760a, 760b.

Example Embodiments of a Multi-Zone Modular Transfer Unit

Figure 12:
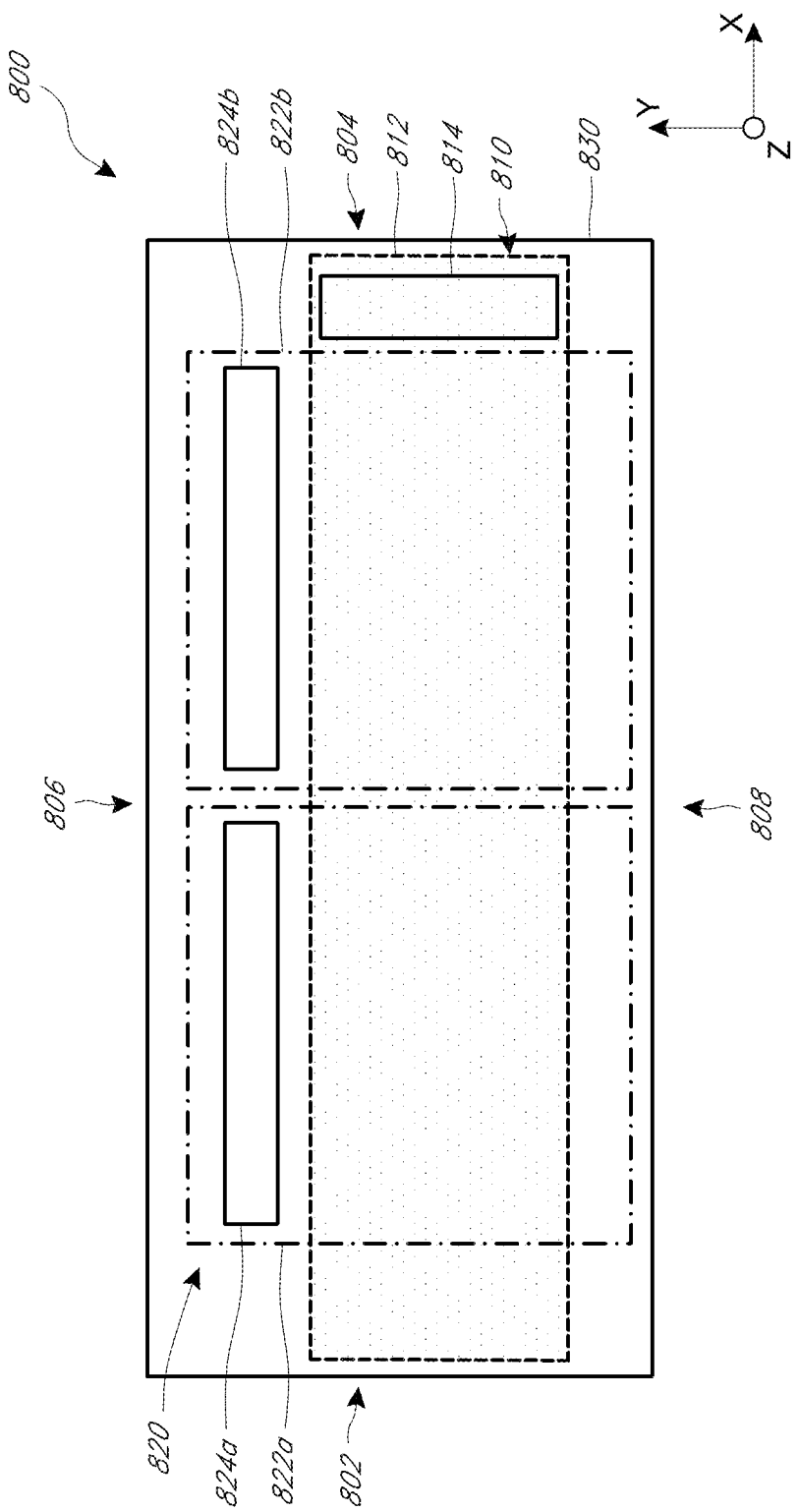
FIG. 12 is a top-down schematic of an embodiment of a multi-zone modular transfer unit.

With reference to FIG. 12, a schematic of a modular transfer unit 800 is illustrated. The modular transfer unit 800 can include components, features, and/or functionality which are the same or similar to those of other modular transfer units described herein, such as modular transfer units 100, 200, 300, 410, 520, 522, 620, 622, 624, 626 described above.

The modular transfer unit 800 can have an infeed side 802 at which the modular transfer unit 800 can receive one or more packages from a conveyor system. The modular transfer unit 800 can allow packages to pass through the modular transfer unit 800 in a primary flow path (e.g., in a direction along the x-axis). The modular transfer unit 800 can have a pass-through side 804 at which the modular transfer unit 800 can discharge packages which are intended to be passed through the modular transfer unit 800. The modular transfer unit 800 can redirect or divert packages from the primary flow path. The modular transfer unit 800 can have a first divert side 806 and/or a second divert side 808 at which the modular transfer unit 800 can discharge packages which are intended to be diverted by the modular transfer unit 800.

The modular transfer unit 800 can include a first conveyance system 810 and a second conveyance system 820. The first conveyance system 810, which can be a primary flow system, can move packages along a direction of the primary flow path (e.g., in a direction along the x-axis). As shown, the primary flow system 810 can include a primary flow belt 812 which extends between the infeed side 802 and the pass-through side 804 of the modular transfer unit 800. The primary flow system 810 can include a driver 814, such as a motor, which can be directly coupled to the primary flow belt 812 or indirectly coupled via one or more intermediate components, such as gears. The driver 814 can move the primary flow belt 812 in a direction from the infeed side 802 to the pass-through side 804 of the modular transfer unit 800. In some embodiments, the driver 814 can move the primary flow belt 812 in a direction from the pass-through side 804 to the infeed side 802 of the modular transfer unit 800. The driver 814 can be reversible or intermediate components between the driver 814 and the primary flow belt 812 can allow the driver 814 to drive the primary flow belt 812 in reverse.

With continued reference to FIG. 12, the second conveyance system 820, which can be a divert system, can move packages in a direction which is non-parallel to the primary flow path of the conveyor system (e.g., in a direction not parallel to the x-axis). As shown in the illustrated embodiment, the diverter system 820 can move packages in a direction which is generally orthogonal to the primary flow path of the conveyor system (e.g., the diverter system 820 can move packages in a direction along the y-axis). The diverter system 820 can include a first diverter belt 822a and a second diverter belt 822b which each extend from the first divert side 806 and/or the second divert side 808 of the modular transfer unit 800 and/or overlaps at least partially with the primary flow belt 812. The diverter system 820 can include a first driver 824a and a second driver 824b, such as motors, which can be directly coupled to the diverter belts 822a, 822b or indirectly coupled via one or more intermediate components, such as gears. The drivers 824a, 824b can move the diverter belts 822a, 822b in a direction from the second divert side 808 to the first divert side 806 of the modular transfer unit 800. In some embodiments, the drivers 824a, 824b can move the diverter belts 822a, 822b in a direction from the first divert side 806 to the second divert side 808 of the modular transfer unit 800. The driver 824 can be reversible or intermediate components between the drivers 824a, 824b and the diverter belts 822a, 822b can allow the drivers 824a, 824b to drive the diverter belts 822a, 822b in reverse.

The modular transfer unit 800 can include a frame 830 which can be used to support one or more components of the modular transfer unit 800. For example, as shown in the illustrated embodiment, the frame 830 can support components of the primary flow system 810 and the diverter system 820. As such, the modular transfer unit 800 can be a standalone, self-contained system capable of operating separately from a conveyor system. In some implementations, the housing 830 can be sized to fit between components of a conveyor system. This can beneficially allow the modular transfer unit 800 to be implemented on an as-needed basis in a conveyor system. In so doing, the modular transfer unit 800 to be swapped from one position in a conveyor system to another position in the conveyor system depending on the needs of the operator. In some implementations, the housing 830 can be sized to be retrofitted to existing conveyor systems.

In some embodiments, the electronics of the modular transfer unit 800 can be run at low voltages. In some instances, this can allow the modular transfer unit 800 to be utilized without running electrical wires through a conduit thereby reducing overall complexity and costs for the modular transfer unit 800. In some embodiments, the electronics of the modular transfer unit 800 can be run at low voltages, such as at or below about 50V. In some embodiments, the electronics of the modular transfer unit 100 are configured to operate at voltages of approximately 24V or less.

Figure 13:
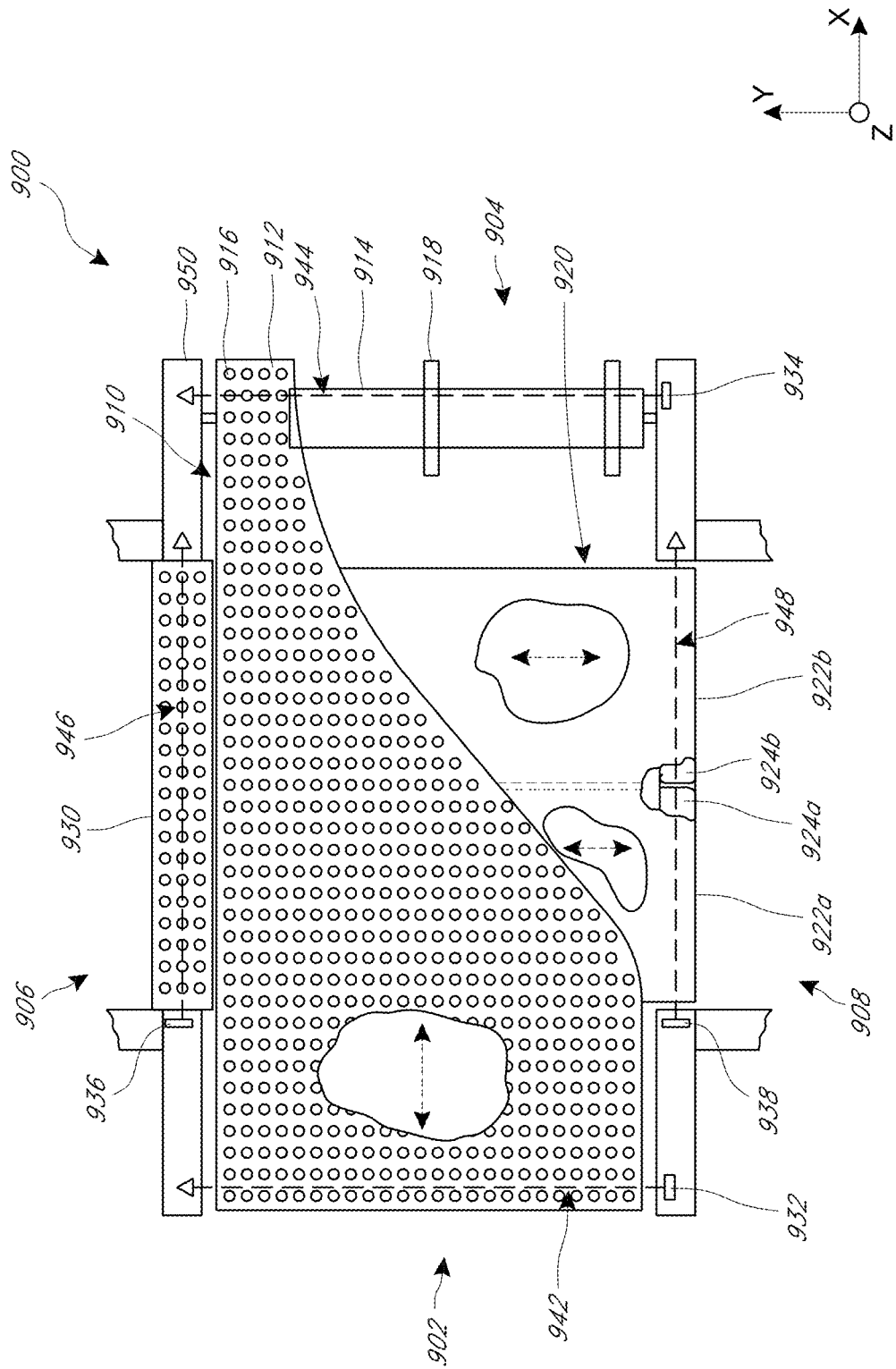
FIG. 13 is a top-down schematic of an embodiment of a multi-zone modular transfer unit.

With reference next to FIG. 13, an embodiment of a modular transfer unit 900 is illustrated in a partial cut-away view. The modular transfer unit 900 can include components, features, and/or functionality which are the same or similar to those of other modular transfer units described herein, such as modular transfer units 100, 200, 300, 410, 520, 522, 620, 622, 624, 626, 800 described above.

The modular transfer unit 900 can have an infeed side 902 at which the modular transfer unit 900 can receive one or more packages from a conveyor system. The modular transfer unit 900 can allow packages to pass through the modular transfer unit 900 in a primary flow path (e.g., in a direction along the x-axis). The modular transfer unit 900 can have a pass-through side 904 at which the modular transfer unit 900 can discharge packages which are intended to be passed through the modular transfer unit 900. The modular transfer unit 900 can redirect or divert packages from the primary flow path. The modular transfer unit 900 can have a first divert side 906 and/or a second divert side 908 at which the modular transfer unit 900 can discharge packages which are intended to be diverted by the modular transfer unit 900.

The modular transfer unit 900 can include a first conveyance system 910 and a second conveyance system 920. The first conveyance system 910, which can be a primary flow system, can move packages along a direction of the primary flow path (e.g., in a direction along the x-axis). As shown, the primary flow system 910 can include a primary flow belt 912 which extends between the infeed side 902 and the pass-through side 904 of the modular transfer unit 900. The primary flow belt 912 can include one or more movable components 116 which can have one or more translational and/or rotational degrees of freedom. For example, the movable components 916 can be in the form of balls which provide three rotational degrees of freedom. As another example, the movable components 916 can be in the form of rollers which provide one degree of rotational freedom.

The primary flow system 910 can include a driver 914, such as a motorized roller, which can be directly coupled to the primary flow belt 912 or indirectly coupled via one or more intermediate components, such as gears. As shown in the illustrated embodiment, the driver 914 can include coupling features 918, such as sprockets, which can directly engage the primary flow belt 912. The driver 914 can include multiple sprockets which can reduce the force applied by each sprocket on the primary flow belt 912 as the driver 914 is operated. The spacing between the sprockets can be chosen to allow movable components 916 to freely pass over the driver 914. For example, the movable components 916 can pass through the spaces between the sprockets. It is to be understood that the driver 914 can have other geometries appropriate for the structure of the primary flow belt 912. The driver 914 can move the primary flow belt 912 in a direction from the infeed side 902 to the pass-through side 904 of the modular transfer unit 900. In some embodiments, the driver 914 can move the primary flow belt 912 in a direction from the pass-through side 904 to the infeed side 902 of the modular transfer unit 900. The driver 914 can be reversible or intermediate components between the driver 914 and the primary flow belt 912 can allow the driver 914 to drive the primary flow belt 912 in reverse.

With continued reference to FIG. 13, the second conveyance system 920, which can be a divert system, can move packages in a direction which is non-parallel to the primary flow path of the conveyor system (e.g., in a direction not parallel to the x-axis). As shown in the illustrated embodiment, the diverter system 920 can move packages in a direction which is generally orthogonal to the primary flow path of the conveyor system (e.g., the diverter system 920 can move packages in a direction along the y-axis). The diverter system 920 can include a first diverter belt 922a and a second diverter belt 922b which extend from the first divert side 906 and/or the second divert side 908 of the modular transfer unit 900 and/or overlaps at least partially with the primary flow belt 912.

The diverter system 920 can include a first driver 924a and a second driver 924b, such as motorized rollers, which can be directly coupled to the diverter belts 922a, 922b or indirectly coupled via one or more intermediate components, such as gears. The drivers 924a, 924b can move the diverter belts 922a, 922b in a direction from the second divert side 908 to the first divert side 906 of the modular transfer unit 900. In some embodiments, the drivers 924a, 924b can move the diverter belts 922a, 922b in a direction from the first divert side 906 to the second divert side 908 of the modular transfer unit 900. The driver 924 can be reversible or intermediate components between the drivers 924a, 924b and the diverter belts 922a, 922b can allow the drivers 924a, 924b to drive the diverter belts 922a, 922b in reverse.

As shown in the illustrated embodiment, the modular transfer unit 900 can include a support 930 extending between an edge of the primary flow belt 912. This support 930 can include movable components, similar to the movable components 916 of the primary flow belt 912. In some embodiments, this support 930 can be an idle or powered roller. The support 930 can extend between a gap that exists between the primary flow belt 912 and another component of the conveyor system positioned at or proximate the first divert side 906 of the modular transfer unit 900.

With continued reference to FIG. 13, the modular transfer unit 900 can include one or more detection zones formed by one or more sensors. As shown, the modular transfer unit includes an infeed sensor 932 which establishes an infeed detection zone 942, a discharge sensor 934 which establishes a pass-through detection zone 944, a first divert sensor 936 which establishes a first divert detection zone 946, and/or a second divert sensor 938 which establishes a second divert detection zone 948. In some embodiments, the sensors can communicate with a control system of the modular transfer unit 900 and/or a control system of other components of a conveyor system to which the modular transfer unit 900 is attached. This can allow such a control system to control the operation of the modular transfer unit 900 based on the status of the packages on the modular transfer unit 900.

The infeed detection zone 942 can provide an indication that the modular transfer unit 900 has received a package from an inflow component of the conveyor system. The pass-through detection zone 944 can provide an indication that the modular transfer unit 900 has passed a package through the modular transfer unit 900 and to the outflow component of a conveyor system. The first divert detection zone 946 can provide an indication that the modular transfer unit 900 has diverted a package to a first diverted component of the conveyor system. The second divert detection zone 948 can provide an indication that the modular transfer unit 900 has diverted a package to a second diverted component of the conveyor system 900. A fewer or greater number of detection zones can be utilized. For example, additional detection zones may be utilized between the infeed side 902, the pass-through side 904, the first divert side 906, and/or the second divert side 908. This can beneficially enhance monitoring the status/location of the packages on the modular transfer unit 900.

The modular transfer unit 900 can include a frame 950 which can be used to support one or more components of the modular transfer unit 900. For example, as shown in the illustrated embodiment, the frame 950 can support components of the primary flow system 910, the diverter system 920, the support 930, and/or sensors 932, 934, 936, 938. As such, the modular transfer unit 900 can be a standalone, self-contained system capable of operating separately from a conveyor system. In some implementations, the housing 950 can be sized to fit between components of a conveyor system. This can beneficially allow the modular transfer unit 900 to be implemented on an as-needed basis in a conveyor system. In so doing, the modular transfer unit 900 to be swapped from one position in a conveyor system to another position in the conveyor system depending on the needs of the operator. In some implementations, the housing 950 can be sized to be retrofitted to existing conveyor systems.

Figure 14:
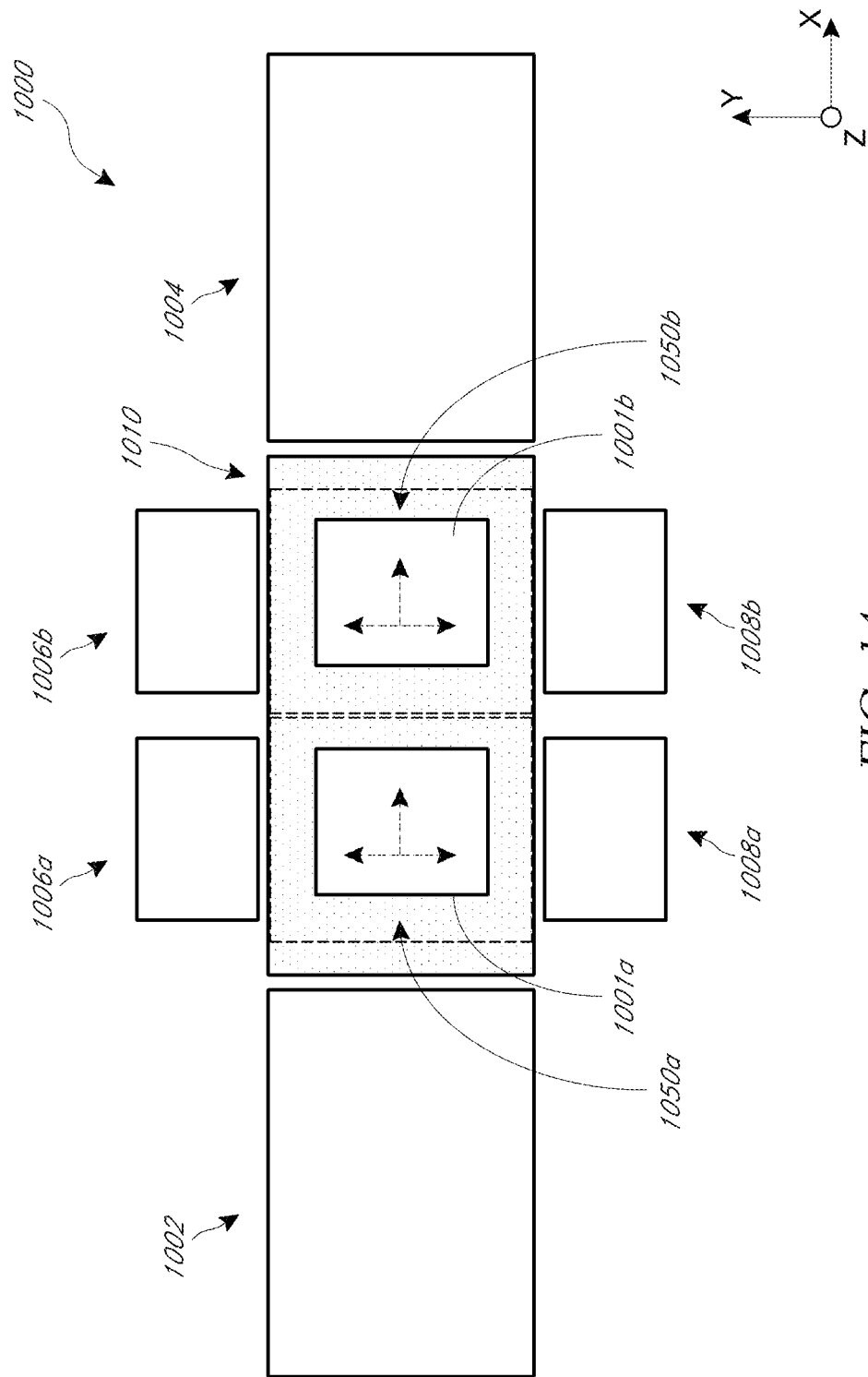
FIG. 14 is a top-down schematic of an embodiment of a conveyor system with a multi-zone modular transfer unit with multiple packages on the multi-zone modular transfer unit.
Figure 15:
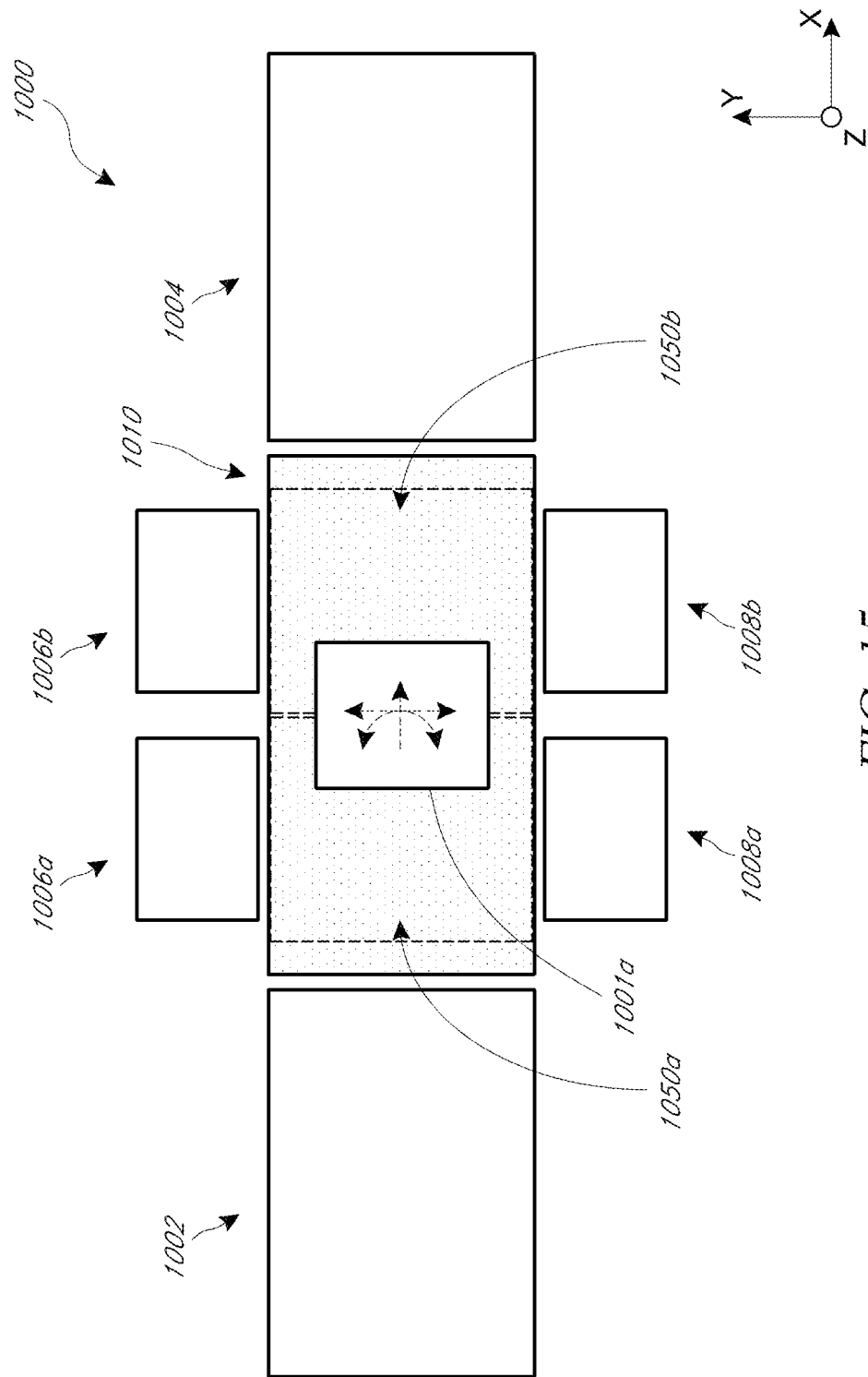
FIG. 15 is a top-down schematic of conveyor system of FIG. 14 with a package positioned between zones of the multi-zone modular transfer unit.

Embodiments of Conveyor System Configurations with Multi-Zone Modular Transfer Unit With reference to FIGS. 14 and 15, a schematic of a conveyor system 1000 with a modular transfer unit 1010 is illustrated. FIG. 14 shows packages 1001a, 1001b after being received by the modular transfer unit 1010 prior to being diverted or passed through by the modular transfer unit 1010. FIG. 15 shows a package 1001a after being received by the modular transfer unit 1010 positioned between two divert zones. The modular transfer unit 1010 can include components, features, and/or functionality which are the same or similar to those of other modular transfer units described herein, such as modular transfer units 100, 200, 300, 410, 520, 522, 620, 622, 624, 626, 800 described above. For example, although not shown in FIG. 14, it is to be understood that system 1000 can include one or more detection zones, such as an infeed detection zone, a pass-through detection zone, and one or more divert detection zones, can be formed by one or more sensors.

With reference first to FIG. 14, the conveyor system 1000 can include an inflow component 1002 which can be positioned at or proximate an inflow side of the modular transfer unit 1010. The inflow component can be, for example, a belted or roller conveyor unit which can deliver the packages to the infeed side of the modular transfer unit 1010. The conveyor system 1000 can include an outflow component 1004 which can be positioned at or proximate a pass-through side of the modular transfer unit 1010. In some embodiments, the outflow component can be a belted or roller conveyor unit which can receive packages from the pass-through side of the modular transfer unit 1010 and convey such packages to another location (e.g., a belted or roller "take-away"). In some embodiments, the outflow component 1004 can be a bin or other receptacle which can receive the package.

The conveyor system 1000 can include a one or more diverted components 1006a, 1006b, 1008a, 1008b which can be positioned at or proximate a first divert side and/or second divert side respectively of the modular transfer unit 1010. In some embodiments, the first diverted components 1006a, 1006b and/or second diverted components 1008a, 1008b can be a belted or roller conveyor unit which can receive packages from the first divert side and/or second divert side respectively and convey such packages to another location. In some embodiments, the first diverted components 1006a, 1006b and/or second diverted components 1008a, 1008b can be a bin or other receptacle which can receive the package.

Although a gap is shown between components 1002, 1004, 1006a, 1006b, 1008a, 1008b of the conveyor system 1000 and the modular transfer unit 1010, it is to be understood that the components can be positioned adjacent to and/or substantially flush with the modular transfer unit 1010. In instances where a gap between one or more of the components 1002, 1004, 1006a, 1006b, 1008a, 1008b of the conveyor system 1000 and the modular transfer unit 1010 exists, a device may be utilized to fill in the gap. For example, a support, such as support 930 described above in connection with FIG. 13, may be positioned between one or more of the components 1002, 1004, 1006a, 1006b, 1008a, 1008b of the conveyor system 1000 and the modular transfer unit 1010.

As shown, packages 1008a, 1008b are positioned at one or more "divert zones" 1050a, 1050b, a position at which the package may be diverted and received by components 1006a, 1006b 1008a, and/or 1008b of the conveyor system 1000. As shown in the illustrated embodiment, components 1006a, 1006b, 1008a, 1008b of the conveyor system 1000 are arranged such that the modular transfer unit 1010 can have a single divert zone 1050a for components 1006a, 1008a and a second divert zone 1050b for components 1006b, 1008b. These divert zones 1050a, 1050b can correspond to the location of separate diverter belts, such as diverter belts 922a, 922b discussed in connection with FIG. 13. In this manner, the modular transfer unit 1010 can divert one or both packages 1001a, 1001b separately in different directions. For example, the modular transfer unit 1010 can implement the method 700 described in connection with FIG. 11.

However, it is to be understood that the modular transfer unit 1010 can have multiple divert zones. For example, multiple components (e.g., belted or roller "take-aways") may be positioned along one or both divert sides. As another example, the positioning of components 1006a, 1006b, 1008a, 1008b may only be partially aligned, or not aligned at all, such that each form separate divert zones.

With reference next to FIG. 15, the package 1001a is illustrated between divert zones 1050a, 1050b. As shown, in this position the package 1001a can be translated in the primary flow path (e.g., in a direction along the x-axis) and/or translated in the divert path (e.g., in a direction along the y-axis) in a similar fashion to that described above. In some embodiments, the package 1001a can be rotated while in this position via a velocity differential between the divert zones 1050a, 1050b are operated. For example, the package 1001a can be rotated counter-clockwise along the z-axis by having the second divert zone 1050b operate to move the package 1001a towards components 1008a, 1008b (e.g., in a "negative" direction along the y-axis) while having the first divert zone 1050a operate to move the package towards components 1006a, 1006b (e.g., in a "positive" direction along the y-axis). Rotation in the counter-clockwise direction can be achieved by reversing operation of the divert zones 1050a, 1050b.

Figure 16:
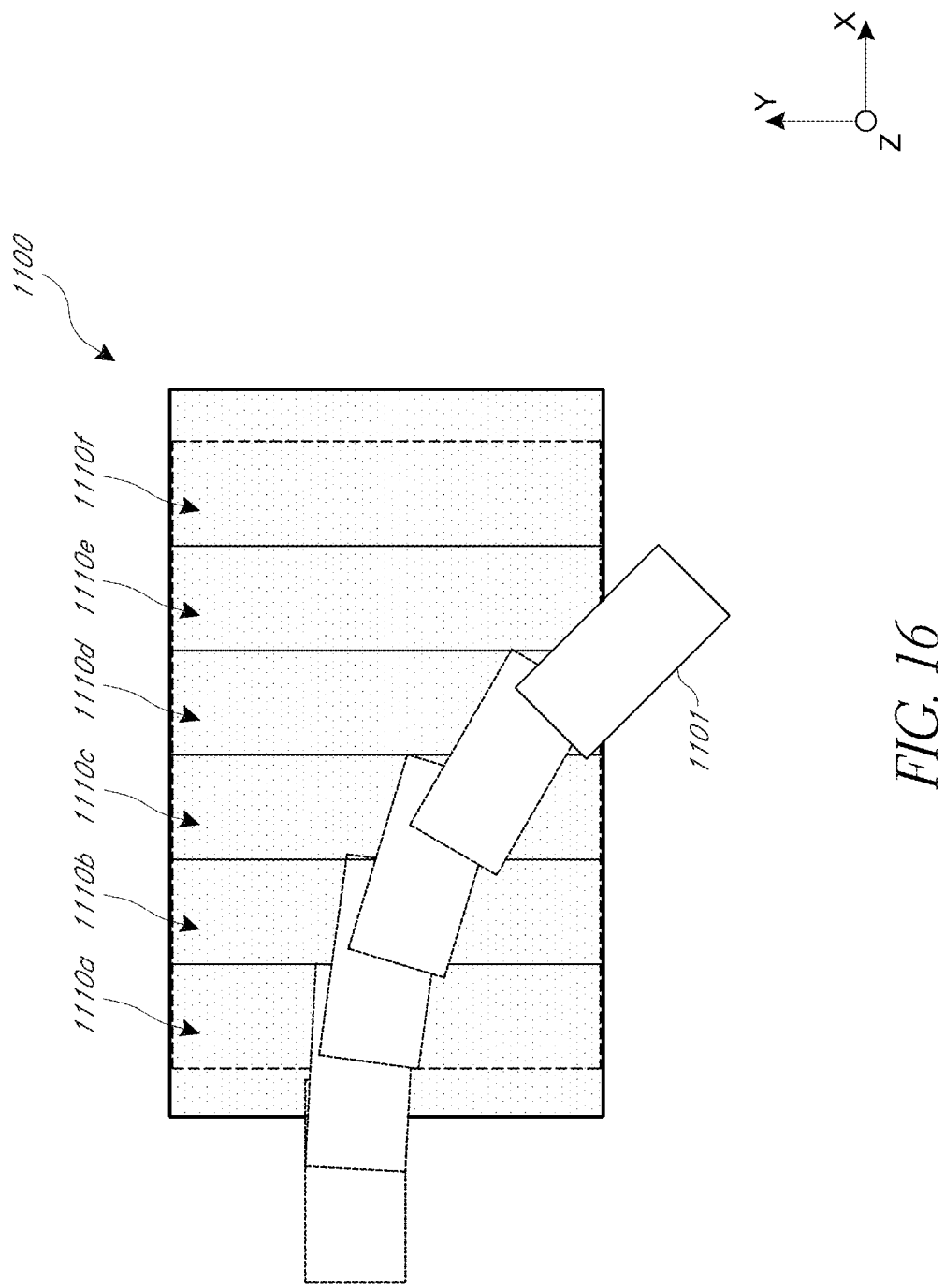
FIG. 16 is a top-down schematic of an embodiment of a multi-zone modular transfer unit illustrating simultaneous diversion and rotation of a package.

Examples of Simultaneous Diversion and Rotation with a Multi-Zone Modular Transfer Unit With reference to FIG. 16, a schematic of a modular transfer unit 1100 is illustrated with a package 1001 shown in various phases of transfer along the modular transfer unit 1100. The modular transfer unit 1010 can include components, features, and/or functionality which are the same or similar to those of other modular transfer units described herein, such as modular transfer units 100, 200, 300, 410, 520, 522, 620, 622, 624, 626, 800, 900 described above.

As shown, the package 1101 passes through multiple "divert zones" 1110a, 1110b, 1110c, 1110d, 1110e. The divert zones 1110a, 1110b, 1110c, 1110d, 1110e, 1100f can correspond to the location of separate diverter belts, such as diverter belts 922a, 922b, etc., such as is discussed in connection with FIG. 13. In various embodiments, the diverter belts, and thus the divert zones, can be operated at different velocities and/or directions. For example, a first diverter belt can be driven toward a first lateral side of the primary flow belt (e.g., to the left in the direction of travel of the primary flow belt) and a second diverter belt can be driven toward a second lateral side of the primary flow belt (e.g., to the right in the direction of travel of the primary flow belt). In some embodiments, the second diverter belt can be longitudinally adjacent to the first belt. In some embodiments, one or more additional diverter belts are positioned longitudinally between the first and second diverter belts. As illustrated, in several embodiments, the divert zones extend from one lateral side of the primary flow belt to the other lateral side of the primary flow belt. In various embodiments, in the direction of travel of the primary flow belt the divert zones extend across multiple of the movable components, such as at least 5, 10, 15 or more of the movable components.

In several embodiments, each of the diverter belts, and thus the divert zones, can be operated independent of the other diverter belts. For example, the diverter belt 1110a can be operated at a first velocity, the diverter belt 1110b can be operated at a second velocity, the diverter belt 1110c can be operated at a third velocity, etc. In various embodiments, the divert zones 1110a, 1110b, 1110c, 1110d, 1110e, 1100f can operate at different velocities. For example, as shown in the illustrated embodiment, the operational velocities of the divert zones 1110a, 1110b, 1110c, 1110d, 1110e, 1100f can be chosen such that the package 1101 is simultaneously translated and rotated as the package 1101 passes through the modular transfer unit 1100. In some embodiments, a belt can operate to move the package 1101 in the primary flow direction (e.g., along the x-axis). Each of the divert zones 1110a, 1110b, 1110c, 1110d, 1110e, 1100f can operate to move the package 1001a in the same divert direction (e.g., along the y-axis) with each of the divert zones 1110a, 1110b, 1110c, 1110d, 1110e, 1100f having progressively higher speeds of operation. As such, as the package 1101 is simultaneously moved in the primary flow direction (e.g., along the x-axis), in the divert direction (e.g., along the y-axis), and rotated clockwise about the z-axis. In some implementations, in the direction of travel of the primary flow belt, the velocities of the diverter belts increases. For example, the diverter belt 1110a can be operated at a first velocity, the diverter belt 1110b can be operated at a second velocity that is greater than the first velocity, the diverter belt 1110c can be operated at a third velocity that is greater than the second velocity, etc. In certain implementations, the difference in velocity between adjacent diverter belts is less than or equal to about 20%. For example, if diverter belt 1110a is operating a velocity X, the maximum velocity of diverter belt 1110b is 1.2X. In certain implementations, the difference in velocity between adjacent diverter belts is less than or equal to about 50%.

Although each of the divert zones 1110a, 1110b, 1110c, 1110d, 1110e, 1100f are shown operating in the same direction with different speeds, it is to be understood that one or more of the divert zones 1110a, 1110b, 1110c, 1110d, 1110e, 1100f can operate in different directions and/or at the same speed. This can allow the package 1101 to be rotated in different directions and/or discharged at different locations.

In some embodiments, the speeds of the divert zones 1110a, 1110b, 1110c, 1110d, 1110e, 1100f can be chosen based on the positioning of the package 1101 prior to being received by the modular transfer unit 1100. For example, if the package 1101 is received closer to the side at which the package 1101 is to be discharged, the speeds of one or more of the divert zones 1110a, 1110b, 1110c, 1110d, 1110e, 1100f may be slowed or may be reversed to ensure that the package is discharged at the desired location and rotated to the desired amount.

Example Embodiments of Drivers

Figure 17:
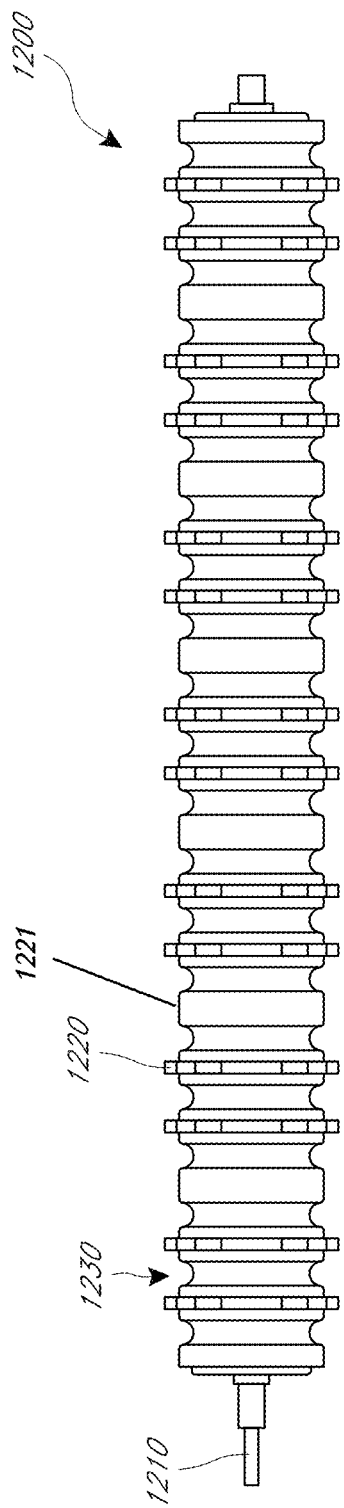
FIG. 17 is a front view of an embodiment of a driver.
Figure 18:
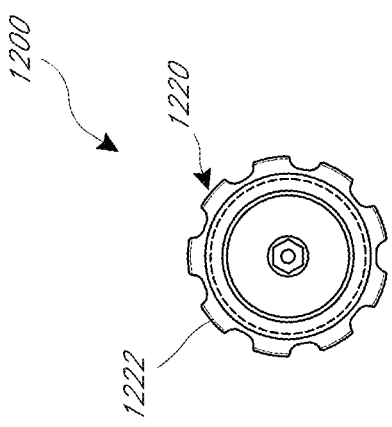
FIG. 18 is a side view of the driver of FIG. 17.

With reference to FIGS. 17 and 18, an embodiment of a drive roller or driver 1200 is illustrated. The driver 1200 can be used to drive a belt of a modular transfer unit, such as those described herein. In some embodiments, the driver 1200 is used to drive the primary belt 112. In some embodiments, the driver 1200 is used to drive the diverter belt 122. In some embodiments, the driver 1200 can be used with a 2253RT belt (available from System Plast S.r.l.) or other belts with features that are the same, or similar to, those described in U.S. Pat. No. 7,021,454, issued Apr. 4, 2006, which is incorporated herein by reference in its entirety.

As shown in the illustrated embodiment, the driver 1200 can include a shaft 1210 to which the driver 1200 can be attached to a power source, such as a motor. The driver 1200 can include one or more sprockets 1220, having teeth 1222, which can engage structures of the belt which the driver 1200 is intended to drive. Some conveyor drivers include one or two sprockets that engage with chains attached with the conveyor belt. This design is responsible for much of the noise of a conveyor system because all of the driving force is concentrated on the one or two chains and sprockets. In some embodiments, the driver 1200 can include an increased number of sprockets to reduce the amount of force applied by each sprocket to the driven belt. For example, as shown in the illustrated embodiment, the driver 1200 can include at least 4, 6, 8, 10, 12, 14, 16, or more sprockets. The increased number of sprockets can reduce the pressure applied by each of the sprockets individually, which can reduce the overall noise associated with use of the driver 1200.

In some implementations, the driver 1200 includes engagement regions 1221. The engagement regions 1221 can provide an additional or alternative driving force on the belt. In various embodiments, the engagement regions 1221 comprise a radially outer surface of the driver 1200. The engagement regions 1221 can engage with a bottom of the belt, such as in regions of the belt that are laterally between the movable components 116. The friction between the engagement regions 1221 and the belt can drive the belt.

In some implementations, the driver 1200 can include a plurality of engagement regions 1221. The greater the number of engagement regions 1221, the less pressure that each individual engagement region 1221 needs to apply in order for there to be sufficient overall force (e.g., through frictional engagement) to drive the belt. A reduction in pressure can promote safety (e.g., by reducing pinch pressure) and/or can facilitate smoother and/or quieter operation of the belt (e.g., as compared to a sprocket driven driver under the same conditions). As shown in FIG. 17, in some implementations, engagement regions 1221 on ends of the driver 1200 have a reduced axial width compared to engagement regions 1221 between the ends.

As shown, the sprockets 1220 and engagement regions 1221 can be combined and/or intermixed. For example, an engagement region 1221 can be laterally bounded by sprockets 1220. In some embodiments, the driver 1200 includes more sprockets 1220 than engagement regions 1221, such as a ratio of at least about 2:1.

The driver 1200 can include one or more recessed areas 1230 (e.g., grooves). The recessed areas 1230 can be sized to allow movable components of the belt, such as movable components 116 described in connection with FIG. 2, to pass over the driver 1200. For example, in cross section, as shown in FIG. 17, the recessed areas 1230 can be semicircular (e.g., to accommodate the shape of movable components 116 in the form of balls). In various embodiments, the recessed areas 1230 is configured to receive a portion of the movable components 116, such as a portion of the movable components 116 that protrudes downwardly. In some implementations, the movable components largely do not contact the driver 1200 because of the recessed areas 1230. This can facilitate smooth and quiet operation of the belt while the belt is being driven by the driver 1200.

Figure 19:
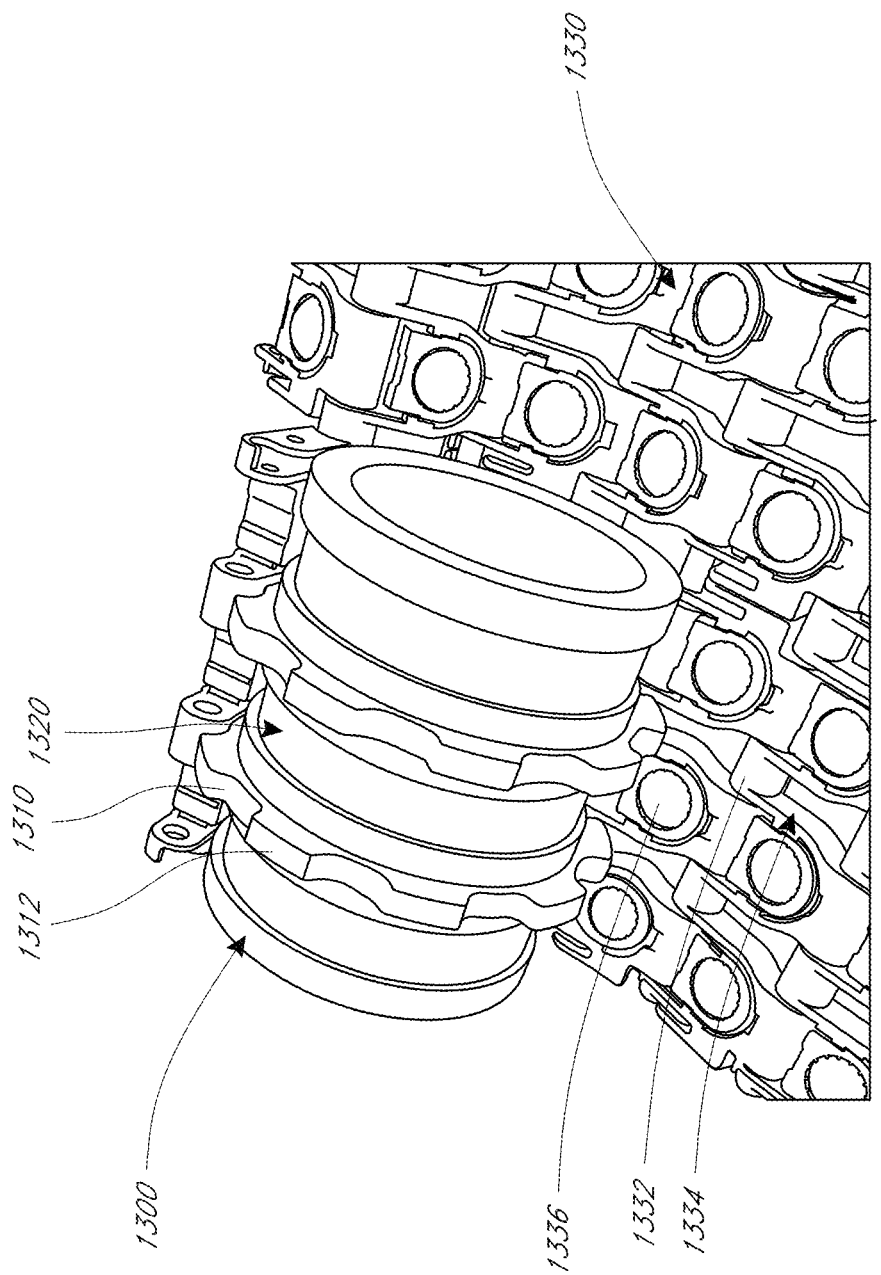
FIG. 19 is a perspective view of another embodiment of a driver and a belt.

With reference to FIG. 19, an embodiment of a driver 1300 and belt 1330 is shown. The driver 1300 can be used to drive the belt 1330 of a modular transfer unit such as those described herein. For example, the belt 1330 can be a 2253RT belt (available from System Plast S.r.l.) or other belts with features that are the same, or similar to, those described in U.S. Pat. No. 7,021,454, issued Apr. 4, 2006, which is incorporated herein by reference in its entirety. In some embodiments, the driver 1300 is used to drive the primary belt 112. In some embodiments, the driver 1300 is used to drive the diverter belt 122.

The driver 1300 can include any of the features of the driver 1200. For example, the driver 1300 can include a shaft (not shown) to which the driver 1300 can be attached to a power source, such as a motor. The driver 1300 can include one or more sprockets 1310, having teeth 1312, which can engage structures of the belt 1330. For example, the teeth 1312 can engage ribbed features 1332 of the belt 1330. These ribbed features 1332 may be, for example, a coupling between links of the belt 1330. The teeth 1312 may be sized to fit within recesses 1334 of the belt 1330. Although the driver 1300 is shown extending only partially across the belt 1330, it is to be understood that the driver 1300 can extend further across the lateral width of the belt 1330. For example, the driver 1300 can extend across the width of the belt 1330. Additionally, although the driver 1300 is shown with only two sprockets, it is to be understood that the driver 1300 can include more sprockets, such as is described above on connection with the driver 1200.

The driver 1300 can include one or more recessed areas 1320, which can be similar or identical to the recessed areas 1230 described above. The recessed areas 1320 can be sized to allow movable components 1336 of the belt 1330 to pass over the driver 1300. This can facilitate smooth operation of the belt 1330 while the belt 1330 is being driven by the driver 1300. The The driver 1300, or any driver described herein, can be lagged. A lagged driver can comprise a coating and/or sheath on a base of the driver, such as a plastic or rubber coating on a metal or plastic base. A lagged driver can enhance the engagement of the driver with the belt 1330, such as by increasing the frictional engagement between the driver 1300 and the belt. In some embodiments, a lagged roller can dampen the noise of the engagement between the driver 1300 (or a component thereof such as the sprockets 1310) and the ribbed features 1332. In certain implementations, at least a portion of the driver 1300 (e.g., a radially outer surface and/or the sprockets 1310) comprises urethane, thermoplastic rubber, ethylene propylene diene monomer (EPDM) rubber, nylon, or other materials. In some variants, the driver 1300 is configured to reduce noise associated with the engagement between the driver 1300 and the belt 1330, while also providing wear resistance. For example, in some embodiments, a portion of the driver 1300 (e.g., the radially outer surface and/or the sprockets 1310) has a Shore D hardness of at least about 70 and/or less than or equal to about 100. In certain embodiments, a portion of the driver 1300 has a Shore D hardness of at least about 80 and/or less than or equal to about 90.

Figure 20:
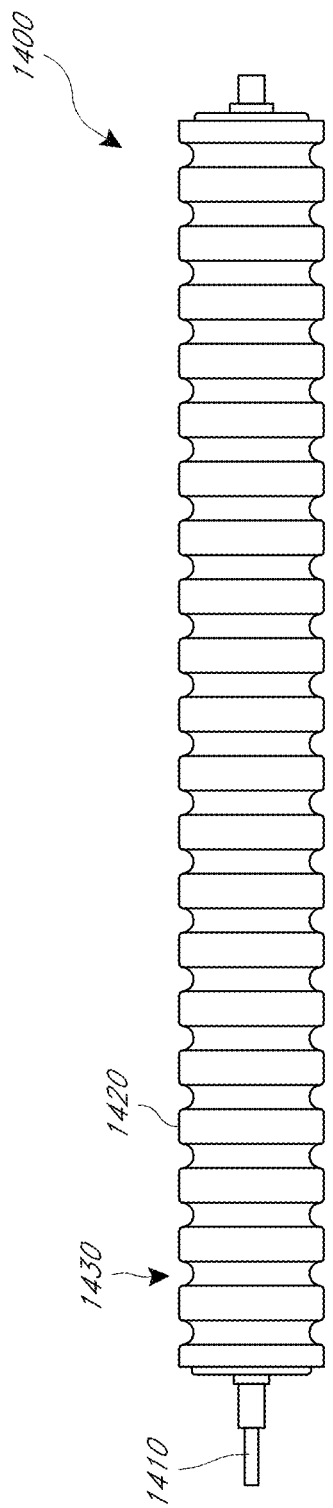
FIG. 20 is a front view of another embodiment of a driver.
Figure 21:
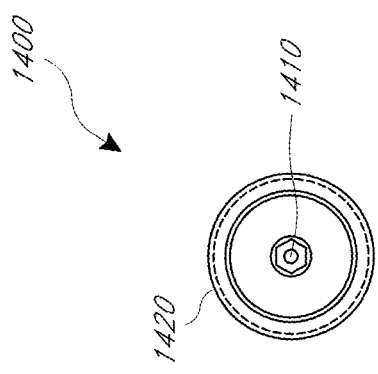
FIG. 21 is a side view of the driver of FIG. 20.

With reference to FIGS. 20 and 21, an embodiment of a driver 1400 is illustrated. The driver 1400 can be used to drive a belt of a modular transfer unit such as those described herein. For example, the driver 1400 can be used with a 2253RT belt (available from System Plast S.r.l.) or other belts. In some embodiments, the driver 1400 is used to drive the primary belt 112. In some embodiments, the driver 1400 is used to drive the diverter belt 122. As shown in FIG. 21, in some embodiments, when viewed from a perspective parallel to a longitudinal axis, the driver 1400 can be circular in shape.

The driver 1400 can include any of the features of the drivers 1200, 1300. For example, the driver 1400 can include a shaft 1410 to which the driver 1400 can be attached to a power source, such as a motor. The driver 1400 can include one or more recessed areas 1430 (e.g., grooves). The recessed areas 1430 can be sized to allow movable components of the belt, such as movable components 116 described in connection with FIG. 2, to pass over the driver 1400. The driver 1400 can include engagement regions 1420 between the recessed areas 1430. The engagement regions 1420 can engage and/or drive the belt. As illustrated, in some embodiments, the driver 1400 does not include a sprocket.

In some implementations, the engagement regions 1420 provide an alternative engagement mechanism to the sprocket. In some implementations, the driver 1400 can include engagement regions 1420 to reduce the amount of force applied by each engagement region 1420 to the driven belt, but to apply sufficient overall force (e.g., through frictional engagement) to engage with the driven belt. This can facilitate smoother and/or quieter operation of the belt while the belt is being driven by the driver 1500 (e.g., as compared to a sprocket driven driver under the same conditions).

Figure 22:
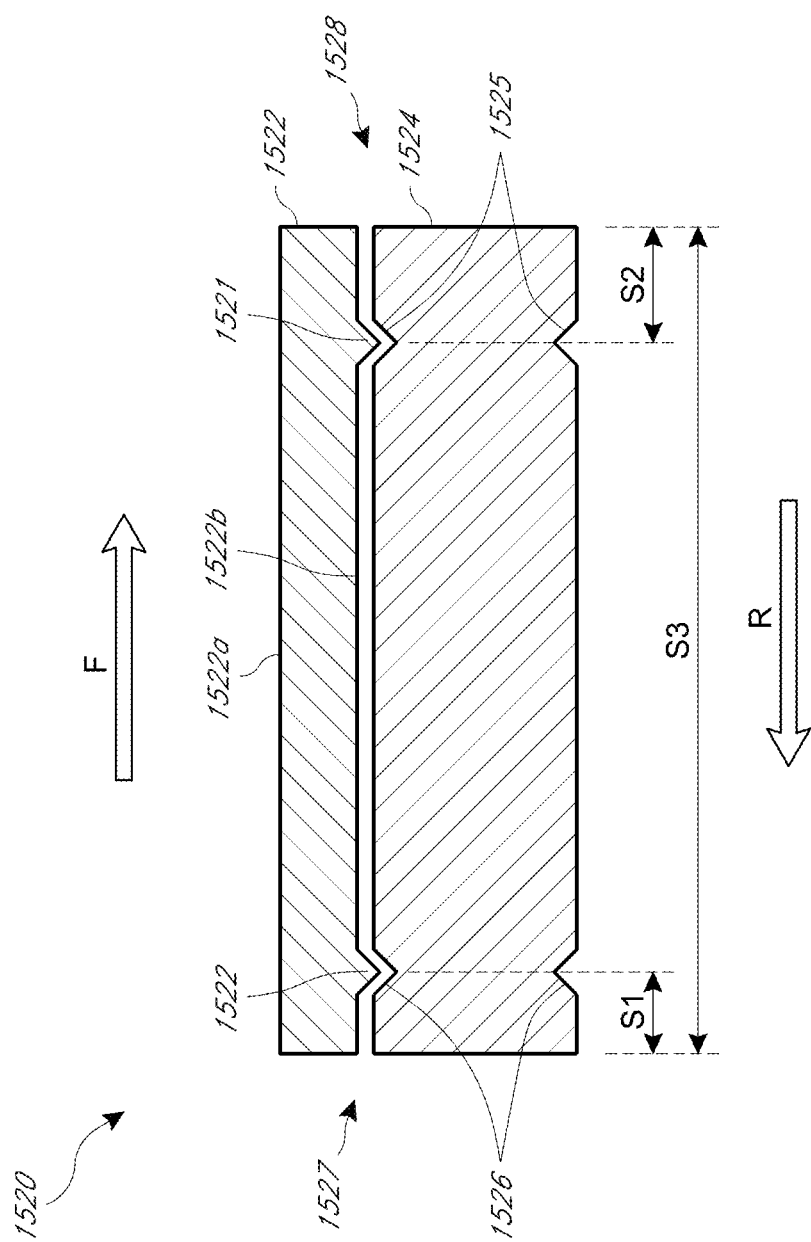
FIG. 22 is a partial cross-section view of a schematic divert system.

With reference to FIG. 22, in some implementations of any of the modular transfer units 100, 200, 300, 410, 520, 522, 620, 622, 624, 626, 800, 900, 1010 described above, a divert system 1520 engages with a primary flow system (not illustrated), such as the first conveyance system 110. A diverter belt 1522 can be engaged with a primary belt. For example, at a top side 1522a of the diverter belt 1522 can engage with an underside of the primary belt, such as with the movable components 116. The diverter belt 1522 can be positioned on a driver 1524, which can be similar or identical to any of the drivers described above. The driver 1524 can rotate to drive the diverter belt.

As discussed above, the diverter belt and primary belt can move relative to each other, such as at a generally perpendicular angle. In some implementations, the primary flow belt can exert a lateral force F on the diverter belt 1522 due to the engagement between the two belts. This lateral force F can cause the diverter belt 1522 to move relative to the primary flow belt and/or the driver 1524, which can be referred to as a "tracking" problem. In some embodiments, the lateral force F can cause the diverter belt 1522 to become misaligned (e.g., off-center) with the driver 1524 in the direction of the primary flow path. For example, the diverter belt 1522 can shift in the direction of the primary flow path. Shifting of the diverter belt 1522 relative to the primary flow belt and/or the driver 1524 can cause problems with the diverter belt 1522. For example, such shifting can increase wear on the diverter belt and/or the driver 1524, can reduce efficiency, and/or can leave portions of the primary flow belt without adequate (or any) engagement with the diverter belt 1522. In some embodiments, shifting of the diverter belt 1522 relative to the primary flow belt and/or the driver 1524 can result in operational errors. For example, such shifting may lead to diverter belt 1522 failing to engage (e.g., rotate) certain of the movable components 116, which may lead to an article conveyed on the primary flow belt being diverted late and/or on an incorrect path. By In some implementations, the divert system 1520 is configured to enhance tracking of the diverter belt 1522 with the driver 1524 and/or the primary flow belt. In some embodiments, the diverter belt 1522 can include tracking facilitation elements, such as first and second ribs 1521, 1523. In some implementations, the first and second ribs 1521, 1523 can extend the length of the diverter belt 1522.

In some variants, the first and second ribs 1521, 1523 are intermittent along the length of the diverter belt 1522.

The driver 1524 can include corresponding tracking facilitation elements, such as first and second channels 1525, 1526. The first and second channels 1525, 1526 can be configured to receive the first and second ribs 1521, 1523, respectively. As shown in FIG. 22, a bottom side 1522b of the diverter belt 1522 engages the driver 1524 and the first and second ribs 1521, 1523 engage within the first and second channels 1525, 1526. The ribs and channels can be shaped to engage in a manner that produces a reactionary force R that is opposite in direction to the lateral force F. For example, the cross-sectional shapes of either or both of the ribs and channels can be v-shaped, rectangular-shaped, arc-shaped, or any other suitable shape. In some implementations, the v-shaped ribs and channels can automatically realign the diverter belt 1522 with the driver 1524 in response to a slight misalignment (e.g., due to the lateral force F). In some implementations, a tip of the v-shaped rib is maintained within the corresponding channel and facilitates realignment of the diverter belt 1522 and the driver 1524.

The first and second ribs 1521, 1523 and channel can be located on opposite ends of the driver 1524. The first rib 1521 (and channel 1525) can be spaced a distance S1 from a first lateral side 1527 of the diverter belt 1522. The second rib 1523 (and channel 1526) can be spaced a distance S2 from a second lateral side 1528 of the diverter belt 1522. A width S3 can separate the first and second lateral sides 1527, 1528. In some implementations, the ratio of S1 and/or S2 to the width S3 can be between $1/10$ and $1/3$. In some implementations S1 and S2 can be substantially equivalent.

Certain Frame Embodiments

Figure 23A:
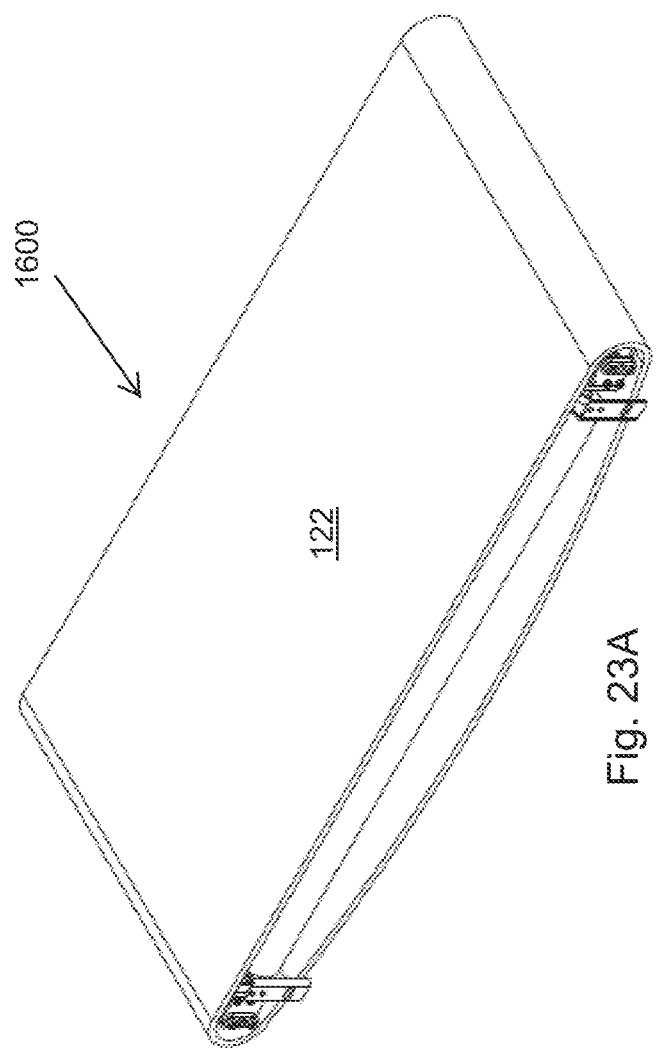
FIGS. 23A and 23B are perspective and side views of a diverter belt unit.
Figure 23B:
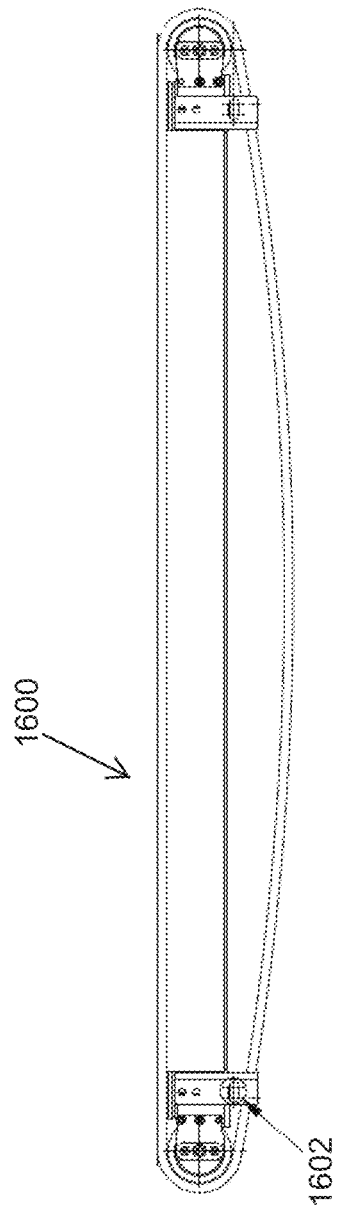
Figure 24:
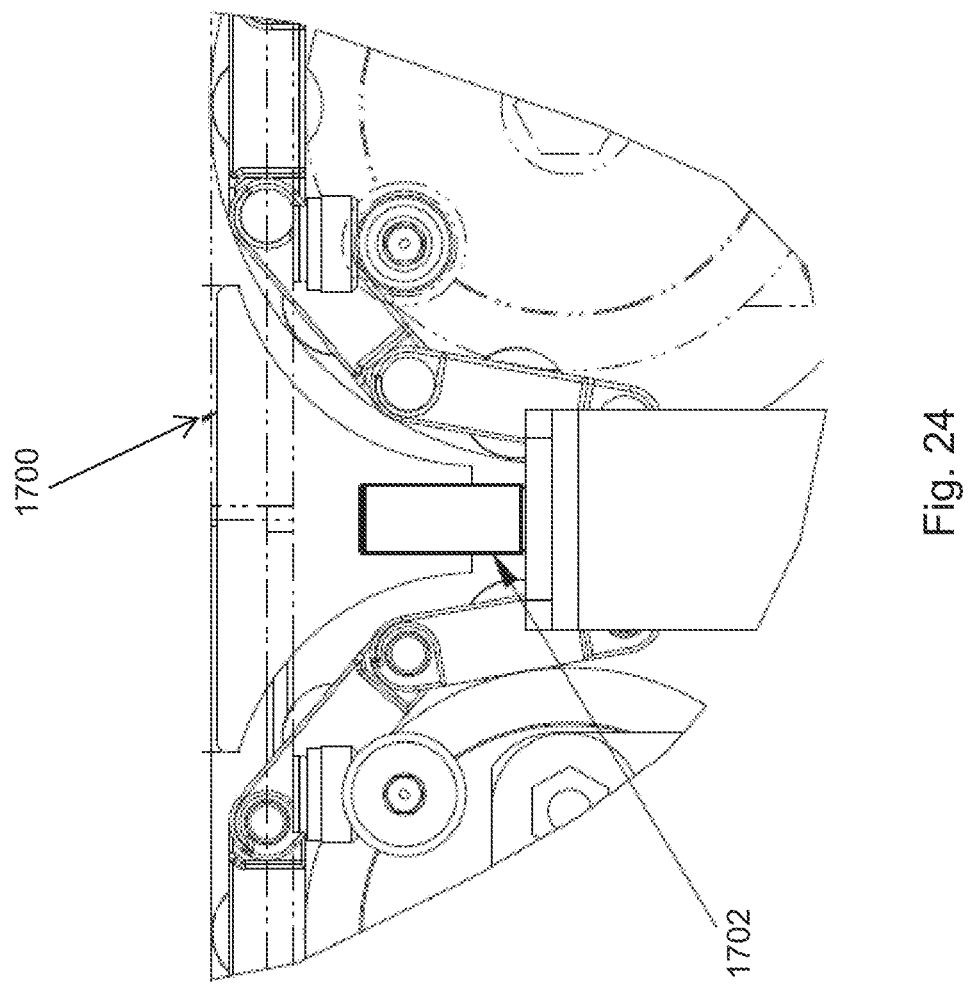
FIG. 24 is a partial cross-sectional view of a transfer module and two primary flow belts.

As mentioned above, in some embodiments, the modular transfer unit 100 can include a frame 130 that can be used to support one or more components of the modular transfer unit 100. In some embodiments, the frame 130 supports both the primary flow belt 112 and the diverter belt 122. In some embodiments, the modular transfer unit 100 does not have a frame 130 that supports both the primary flow belt 112 and the diverter belt 122. For example, the diverter belt 122 can be supported separately from the primary flow belt 112. Having separate support structures for the primary flow and the diverter belts can facilitate installation, removal, and/or maintenance. As shown in FIGS. 23A and 23B, a diverter belt unit 1600 can include the diverter belt 122 and a support structure 1602. The support structure 1602 can include a bracket. As illustrated, in some variants, the support structure 1602 can support a bottom portion of the diverter belt 122, which can reduce sag in the bottom portion of the diverter belt 122. For example, the support structure 1602 can include rails on which a return portion of the diverter belt 122 is supported and/or slides. The support structure 1602 can be connected to support elements, such as legs (not shown).

The primary flow belt 112 can have a support configuration that is similar or identical to what is described above in connection with the diverter belt 122. For example, a primary flow belt unit can include the primary flow belt 112 and a support structure 1602 that engages with support elements, such as legs. In some embodiments, the support structures of the primary flow belt unit and the diverter belt unit engage with the same legs. In some embodiments, the support structures of the primary flow belt unit engage with a first set of legs and the support structures of the diverter belt unit engage with a second set of legs.

Certain Transfer Modules

Some embodiments include features to facilitate conveying goods between conveyor belts, such as between adjacent primary flow belts 112. For example, as shown in FIG. 25, a transfer module 1700 can be positioned in a gap between longitudinally adjacent primary flow belts 112. Goods exiting a first (e.g., upstream) belt can pass along the transfer module to smoothly enter a second (e.g., downstream) belt. In various embodiments, the transfer module 1700 extends substantially from one lateral side of at least one of the primary flow belts 112 to another lateral side of at least one of the primary flow belts 112. As shown, the transfer module 1700 can include concave sides, which can enable the transfer module 1700 to receive portions of the primary flow belts 112 and/or drive elements (e.g., sprockets). In some embodiments, the transfer module 1700 includes a support 1702, such as a bracket. In certain implementations, the support 1702 connects to the frame of the modular transfer unit 100. A top surface of the transfer module 1700 can be generally flush with a top surface of the primary flow belts 112, such as about at the same elevation as the top of the movable components 116.

Figure 25B:
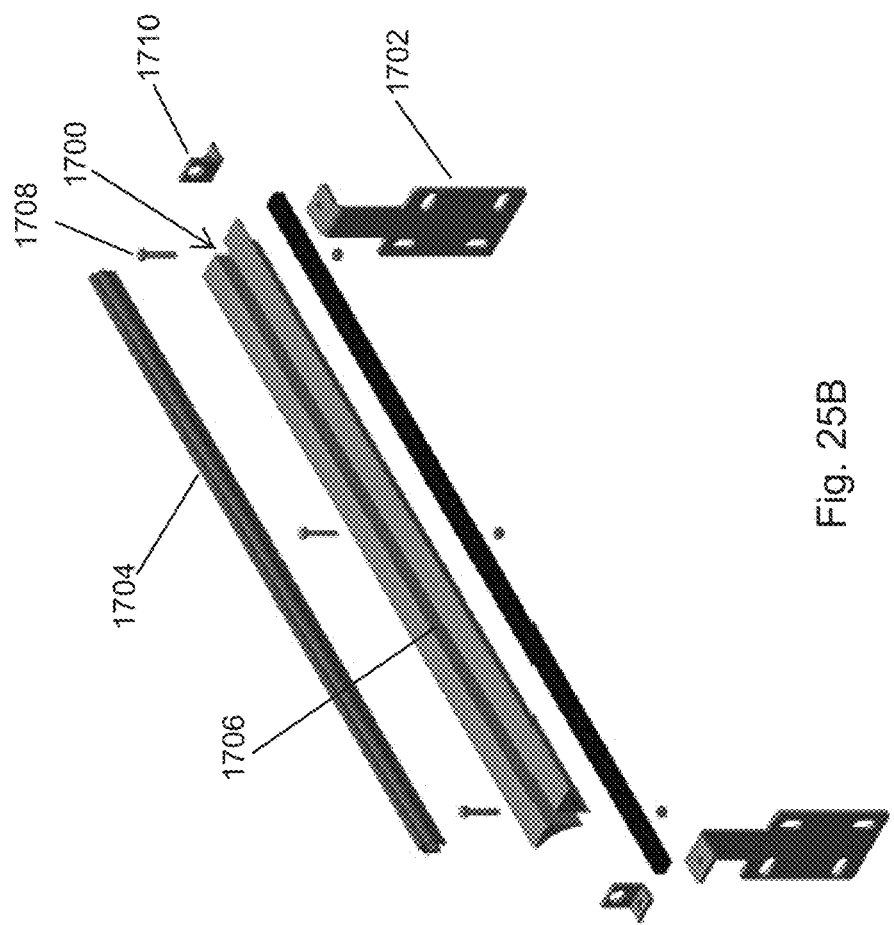
FIGS. 25A and 25B are perspective and exploded views of a transfer module and a sensor.
Figure 25A:
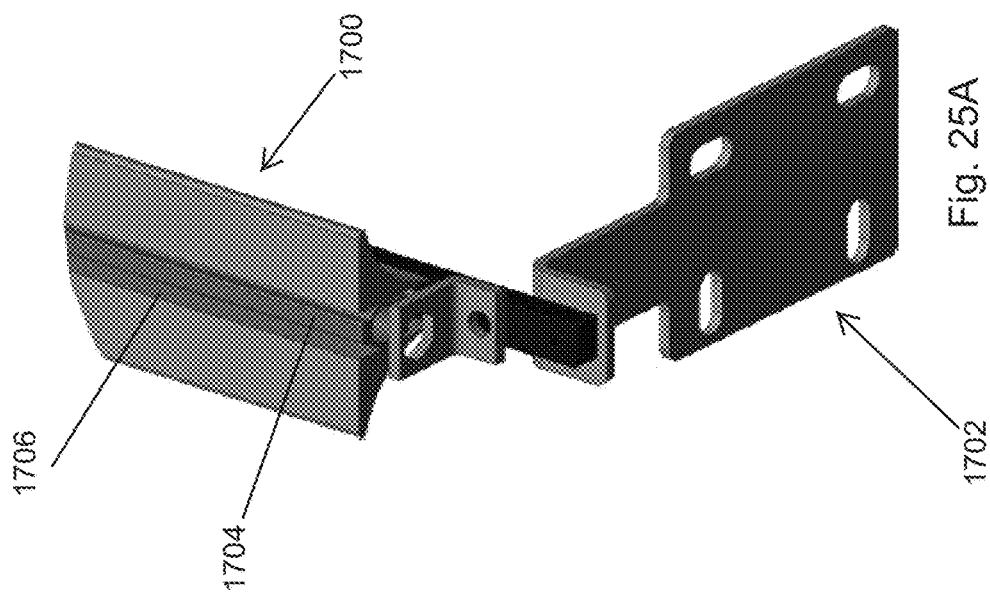

In some embodiments, a sensor 1704, such as a photoelectric sensor, can be positioned in the transfer module 1700. The sensor 1704 can be configured to detect goods on the transfer module 1700. A signal from the sensor 1704 can be sent to a control system that controls the modular transfer unit 100. In certain embodiments, the sensor 1704 extends across substantially the entire lateral width of the transfer module 1700 and/or at least one of the primary flow belts 112. In some variants, such as is shown in FIGS. 25A and 25B, the sensor 1704 can be positioned in a recess 1706 in the transfer module 1700. An upper surface of the sensor 1704 can be generally flat and/or generally flush with an upper surface of the transfer module 1700, which can aid in detecting and/or supporting goods. In certain embodiments, the transfer module 1700 and/or the sensor 1704 are secured to a support surface (e.g., a frame of the modular transfer unit 100) with fasteners 1708, such as bolts and nuts. In some variants, a bracket 1710 is used to secure the sensor 1704 in the transfer module 1700.

Certain Filler Elements

Figure 26:
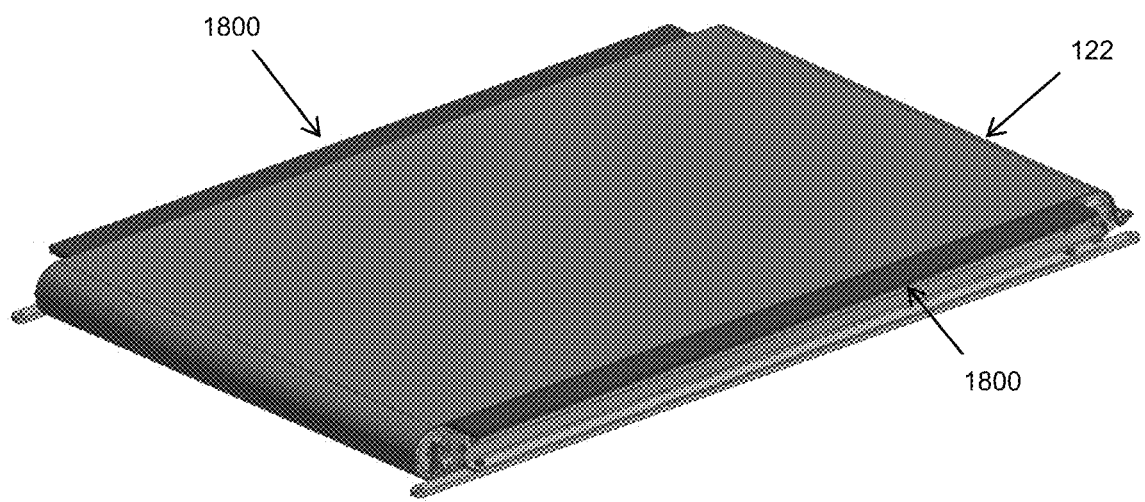
FIG. 26 is a perspective view of a diverter belt with filler elements.

As shown in FIG. 26, in some embodiments, the modular transfer unit 100 includes a filler element 1800, such as a filler plate. The filler element 1800 can be configured to contact the underside of the plurality of movable components 116 of the primary flow belt 112. The filler element 1800 can be positioned in a "dead space" near the entry and/or exit of the primary flow belt 112. The dead space near the entry can be a gap in which the moving components 116 have rotated off of the drive element (e.g., a roller or sprocket) that drives the primary flow belt 112 and/or onto the top surface of the primary flow belt 112, but have not yet moved into contact with the upstream lateral edge of the diverter belt 122. The dead space near the exit can be a gap in which the moving components 116 have moved past the downstream lateral edge of the diverter belt 122 but have not yet exited the top surface of the primary flow belt 112 and/or engaged with the drive element. In the dead space, the movable components 116 are on the conveying surface of the primary flow belt 112 but are not being caused to rotate. This can reduce control of goods conveyed on the primary flow belt 112, cause unwanted speed changes of the goods, or other issues.

In various embodiments, the filler element 1800 can reduce or eliminate the dead space. For example, the filler element 1800 can fill the gap and cause the movable components 116 to begin rotating before the movable components 116 contact the diverter belt 122. In some embodiments, the filler element 1800 causes the movable components 116 to begin rotating substantially immediately after the movable components 116 disengages from the drive element, such as within less than or equal to about 0.5 seconds and/or within less than or equal to about 10 mm of travel of the primary flow belt 112.

In some implementations, the filler element 1800 can fill the gap and cause the movable components 116 to continue rotating after passing longitudinally beyond the downstream lateral edge of the diverter belt 122. In certain embodiments, the filler element 1800 causes the movable components 116 to continue rotating until substantially immediately before the movable components 116 engage with the drive element. For example, in some variants, the gap in which the movable components 116 on the top of the primary flow belt 112 are not engaged (e.g., being caused to rotate) is less than or equal to about 0.5 seconds and/or less than or equal to about 10 mm of travel of the primary flow belt 112.

In various embodiments, the filler element 1800 can be positioned adjacent to and/or between the drive element and a lateral edge of the diverter belt 122. In some embodiments, the filler element 1800 can include concave sides, which can enable the filler element to receive portions of the primary flow belts 112 and/or drive elements (e.g., sprockets). In some implementations, the filler element 1800 comprises a generally flat plate. Some embodiments have a filler element 1800 that is positioned next to one lateral edge of the diverter belt 122, such as next to the upstream or downstream lateral edge. Certain embodiments, such as the embodiment shown in FIG. 26, have a plurality of filler elements 1800, such as a filler element positioned next to the upstream and downstream lateral edges of the diverter belt. A top surface of the filler element 1800 can be generally co-planar with and/or generally parallel to a top surface of the diverter belt 122. In various embodiments, the filler element 1800 is located underneath the conveying surface of the primary flow belt 112.

Certain Other Embodiments

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain Terminology

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Although the modular transfer system has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The invention claimed is:

1. A modular transfer system comprising:
   a main belt comprising an upper surface, a lower surface, and a plurality of spherical balls, the spherical balls having an upper portion that protrudes above the upper surface and a lower portion that protrudes below the lower surface, the spherical balls configured to rotate relative to the upper and lower surfaces, the main belt configured to travel in a first direction;
   a diverter belt configured to travel in a second direction that is generally perpendicular to the first direction, the diverter belt in contact with the protruding lower portion of the spherical balls such that relative movement of the main and diverter belts causes the spherical balls to rotate; and
   a main belt drive unit configured to drive the main belt in the first direction, the main belt drive unit comprising a motor and a motorized drive roller, the motorized drive roller comprising:
      a longitudinal axis;
      a radially outer surface that is configured to engage with the lower surface of the main belt to provide frictional driving force on the main belt; and
      a plurality of recesses having a semi-circular shape from a perspective perpendicular to the longitudinal axis, the recesses configured to receive the lower portion of a respective one of the spherical balls.

2. The modular transfer system of claim 1, wherein the recesses are longitudinally spaced apart from each other in a direction parallel to the longitudinal axis.

3. The modular transfer system of claim 1, wherein the recesses are annular.

4. The modular transfer system of claim 1, wherein, from a perspective parallel to the longitudinal axis, the motorized drive roller is circular in shape.

5. The modular transfer system of claim 1, wherein the motorized drive roller does not comprise a sprocket.

6. The modular transfer system of claim 1, wherein the motorized drive roller comprises a plastic base and a rubber coating.

7. The modular transfer system of claim 1, wherein the radially outer surface of the motorized drive roller further comprises a plastic or rubber coating.

8. The modular transfer system of claim 1, wherein the radially outer surface of the motorized drive roller further comprises a urethane coating.

9. The modular transfer system of claim 1, wherein the balls are longitudinally spaced apart by less than or equal to about 1 inch center-to-center.

10. The modular transfer system of claim 1, wherein the modular transfer system operates at electric voltages of approximately 24 volts or less.

11. A modular transfer system comprising:
    a main belt comprising an upper surface, a lower surface, and a plurality of spherical balls, the spherical balls having an upper portion that protrudes above the upper surface and a lower portion that protrudes below the lower surface, the spherical balls configured to rotate relative to the upper and lower surfaces, the main belt configured to travel in a first direction;
    a diverter belt configured to travel in a second direction that is generally perpendicular to the first direction, the diverter belt in contact with the protruding lower portion of the spherical balls such that relative movement of the main and diverter belts causes the spherical balls to rotate; and
    a motorized drive roller configured to drive the main belt in the first direction, motorized drive roller comprising:
       a longitudinal axis;
       a radially outer surface comprising a plurality of engagement regions that are configured to engage with the lower surface of the main belt to provide frictional driving force on the main belt,
    a plurality of semi-circular recesses that are configured to accommodate the lower portion of a respective one of the spherical balls, the semi-circular recesses being longitudinally spaced apart in a direction parallel to the longitudinal axis, wherein longitudinally neighboring semi-circular recesses are spaced apart by at least one of the engagement regions.

12. The modular transfer system of claim 11, wherein the motorized drive roller has a circular cross-sectional shape.

13. The modular transfer system of claim 11, wherein the recesses are annular.

14. The modular transfer system of claim 11, wherein, from a perspective parallel to the longitudinal axis, the motorized drive roller is circular in shape.

15. The modular transfer system of claim 11, wherein each of the engagement regions have the same outside diameter.

16. The modular transfer system of claim 11, wherein the motorized drive roller does not comprise a sprocket.

17. The modular transfer system of claim 11, wherein the motorized drive roller comprises a plastic base and a rubber coating.

18. The modular transfer system of claim 11, wherein the radially outer surface of the motorized drive roller further comprises a urethane coating.

19. The modular transfer system of claim 11, wherein the balls are longitudinally spaced apart by less than or equal to about 1 inch center-to-center.

20. The modular transfer system of claim 11, wherein the modular transfer system operates at electric voltages of approximately 24 volts or less.

* * * * *